US007049708B2

(12) United States Patent
Hartman et al.

(10) Patent No.: US 7,049,708 B2
(45) Date of Patent: May 23, 2006

(54) MOBILE ELECTRICAL POWER SOURCE

(76) Inventors: Albert Hartman, 4013 Ben Lomond Dr., Palo Alto, CA (US) 94306; Benjamin Huang, 114 Lowell Ave., Palo Alto, CA (US) 94301; William Akin, 1045 Brookview Ct., Morgan Hill, CA (US) 95037; Brooks Leman, 299 Manzanita Ave., Santa Clara, CA (US) 95051; John Masles, 2753 Glauser Dr., San Jose, CA (US) 95133; Joe Tomasic, 271 Carnegie Dr., Milpitas, CA (US) 95035

( * ) Notice: Subject to any disclaimer, the term of this patent is extended or adjusted under 35 U.S.C. 154(b) by 0 days.

(21) Appl. No.: 11/029,123

(22) Filed: Jan. 3, 2005

(65) Prior Publication Data

US 2005/0116472 A1  Jun. 2, 2005

Related U.S. Application Data

(62) Division of application No. 10/693,600, filed on Oct. 23, 2003.

(51) Int. Cl.
*F02B 63/04* (2006.01)

(52) U.S. Cl. .................. 290/1 A; 290/1 C; 290/1 E; 290/38 A

(58) Field of Classification Search ................ 290/1 A, 290/1 E, 1 C, 38 A
See application file for complete search history.

(56) References Cited

U.S. PATENT DOCUMENTS

| 1,131,063 | A | 3/1915 | Klemmer |
| 1,368,700 | A | 2/1921 | DeVitt |
| 3,633,106 | A | 1/1972 | Willis |
| 4,227,092 | A | 10/1980 | Campagnuolo et al. |
| 4,360,860 | A | 11/1982 | Johnson et al. |
| 4,555,656 | A | 11/1985 | Ryan |

(Continued)

FOREIGN PATENT DOCUMENTS

CA  2265149  5/2000

(Continued)

OTHER PUBLICATIONS

Hartman, A., Lorimer, W., "Cogging Torque Control in BLDC Motors", Proceedings Incremental Motion Control Systems and Devices, Jul., 2000.

(Continued)

*Primary Examiner*—Nicholas Ponomarenko
*Assistant Examiner*—Iraj A. Mohandesi
(74) *Attorney, Agent, or Firm*—Steven G. Roeder

(57) ABSTRACT

A portable power source (10) includes a housing (12), a stator component (20), a rotor component (18), a crank assembly (14), and a control system (24). The stator component (20) is secured to the housing (12), the rotor component (18) rotates relative to the stator component (20) and the crank assembly (14) is coupled to the rotor component (18). The crank assembly (14) is rotated by the user relative to the housing (12). As provided herein, rotation of the crank assembly (14) by the user results in rotation of the rotor component (18) relative to the stator component (20). In one embodiment, the control system (24) controls the amount of torque required to rotate the crank assembly (14). For example, the amount of torque required to rotate the crank assembly (14) is varied according to the rotational position of the crank assembly (14). In one embodiment, the crank assembly (14) includes a one-way drive mechanism assembly (725) that allows for unidirection rotation of the rotor component (18) and pedals (708A) (708B) that move up and down.

18 Claims, 26 Drawing Sheets

U.S. PATENT DOCUMENTS

| | | | |
|---|---|---|---|
| 4,701,835 A * | 10/1987 | Campagnuolo et al. | 362/192 |
| 4,703,188 A | 10/1987 | Gottfried | |
| 5,204,569 A | 4/1993 | Hino et al. | |
| 5,243,224 A | 9/1993 | Tagney, Jr. | |
| 5,252,859 A | 10/1993 | Tagney, Jr. | |
| 5,418,415 A | 5/1995 | Ishizaki | |
| 5,442,972 A | 8/1995 | Hoover | |
| 5,496,238 A | 3/1996 | Taylor | |
| 5,616,104 A | 4/1997 | Mulenburg et al. | |
| 5,630,155 A | 5/1997 | Karaki et al. | |
| 5,644,207 A | 7/1997 | Lew et al. | |
| 5,880,532 A | 3/1999 | Stopher | |
| 5,905,359 A | 5/1999 | Jimena | |
| 5,917,310 A | 6/1999 | Baylis | |
| 5,949,215 A | 9/1999 | Takakura | |
| 6,034,492 A | 3/2000 | Saito et al. | |
| 6,133,642 A | 10/2000 | Hutchinson | |
| 6,217,398 B1 | 4/2001 | Davis | |
| 6,236,118 B1 | 5/2001 | Vasija et al. | |
| 6,291,900 B1 | 9/2001 | Tiemann et al. | |
| 6,380,711 B1 | 4/2002 | Fischer et al. | |
| 6,472,846 B1 | 10/2002 | Becker et al. | |
| 6,477,116 B1 | 11/2002 | Shinkawa et al. | |
| 6,556,867 B1 | 4/2003 | Kohls | |
| 6,624,529 B1 * | 9/2003 | Obayashi | 290/40 C |
| 2001/0047515 A1 | 11/2001 | Schreer | |

FOREIGN PATENT DOCUMENTS

| | | |
|---|---|---|
| DE | 2839347 A1 | 3/1980 |
| DE | 3630843 A1 | 3/1988 |
| DE | 20008135 U1 | 9/2000 |
| GB | 2304208 | 3/1997 |
| GB | 2371155 | 7/2002 |
| GB | 2380540 | 4/2003 |
| JP | 358156235 A | 9/1983 |
| JP | 1020373 A | 1/1998 |
| JP | 200287499 A | 10/2000 |
| JP | 2001-136707 | 5/2001 |
| JP | 2003009596 A | 1/2003 |
| WO | WO-99/31783 | 6/1999 |
| WO | WO-0116525 | 3/2001 |
| WO | WO 01/31764 A1 | 5/2001 |
| WO | WO-02052692 | 7/2002 |

OTHER PUBLICATIONS

Byrnee, Hugh J., "Batter Chargers and Hand Crank Generators", 21$^{st}$ Annual Proceedings Power Sources Conference, May, 1967.

Bovitz, R.S., "Development of Generator Direct Current G-63 and G-67 (Hand Cranked)", Contract DAAB07-70-C-0075, US ARMY Electronics Command, May, 1972.

Widiner, K.J., "Development of Generator Direct Current G-63 (Hand Cranked)", Contract DA28-043-AMC-01605(E), US ARMY Electronics Command, May, 1967.

Fischetti, Mark. "Crank It Up!" Scientific American: Working Knowledge: Crank It Up!: Aug. 2001. Found at: http://www.sciam.com/.

"Motorola unveils windup charger for cell phones." 2002 Associated Press. Found at: http://www.msnbc.com (Jan. 15, 2002).

Ogando, Joseph. "No charge? No Problem." Sep. 9, 2002. Design News Product Design Online. Found at: http://www.manufacturing.net/DN/index.asp?.

*Aladdin Power Specications.* "AladdinPower Systems". Nissho Engineering Co., Ltd. Jul. 24, 2004. http://www.nseg.co.jp/english/products/aladdin/index.htm.

*Step Charger Specifications.* "Stepcharger". Nissho Engineering Co., Ltd. Jul. 24, 2004. http://www.nseg.co.jp/english/products/step/index.htm.

*NEASIA Online. Powered by Nikkei Electronics Asia.* "Cover Story: Portable Devices Become Self-Chargeable". Jul. 24, 2004. http://neasia.nikkeibp.com/nea/200308/conele_259890.html.

* cited by examiner

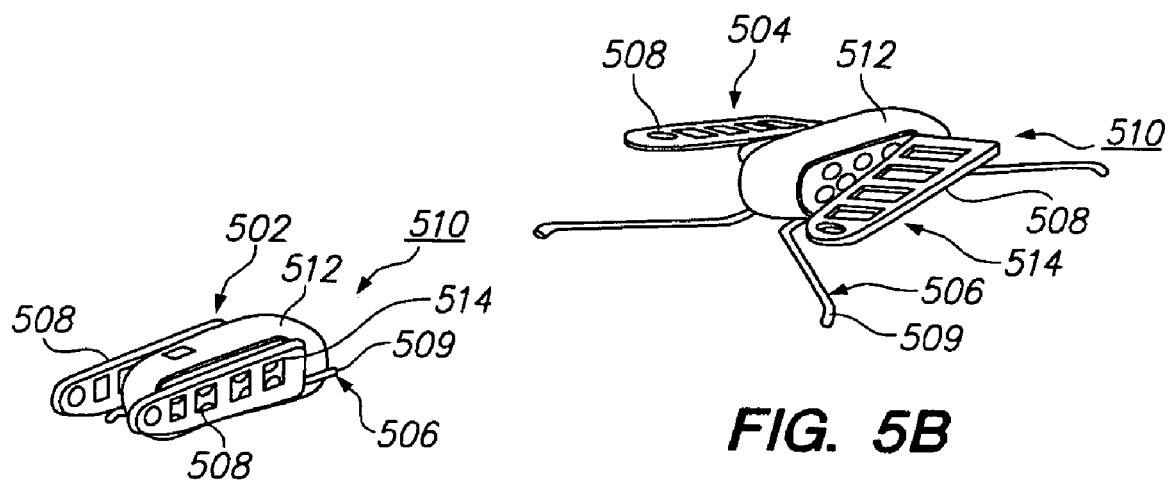
FIG. 5A
FIG. 5B
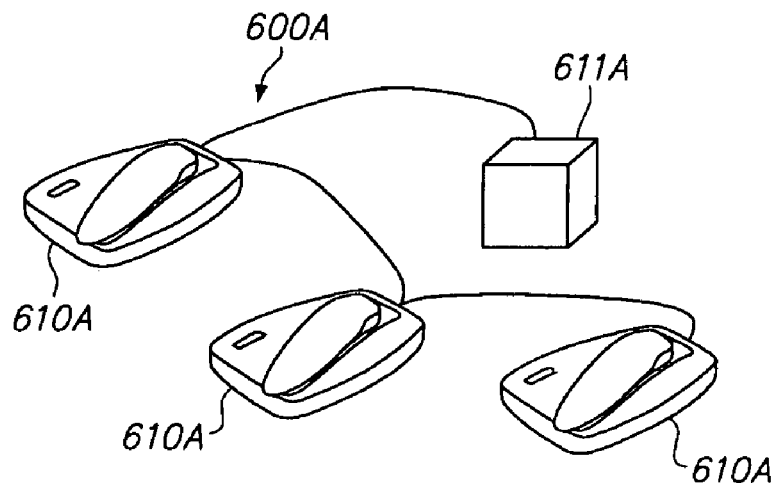
FIG. 6A

Release of pressure on the petals. Due to a running condition.

MOBILE ELECTRICAL POWER SOURCE

CROSS-REFERENCE TO RELATED APPLICATION

This is a divisional application and claims priority on U.S. patent application Ser. No. 10/693,600 filed on Oct. 23, 2003, the contents of which are incorporated herein by reference.

FIELD OF THE INVENTION

The present invention relates generally to manually driven power generators.

BACKGROUND

Portable electronic devices are used for a variety of useful functions, including (i) communications devices such as mobile telephones, citizen band radios, family radio spectrum radio, and wireless internet devices, (ii) portable computing devices such as notebook computers, personal digital assistants, and calculators, (iii) military electronic devices, such as night visions devices, communications devices, precision GPS, laser targeting devices, data displays, and computing devices, and (iv) other items such as digital cameras, camcorders, global position satellite devices, portable electronic games, flashlights, radios, and audio CD/MP3 players. Further, many more such types of devices are being created all the time. In some cases, the new electronic devices have become critically important to public safety such as 911 emergency service on mobile telephones, or global position satellite devices for general aviation and marine use.

One common element in all these portable electronic devices is their need for portable electrical power. This has been traditionally solved by using assemblies of chemical batteries, either the one time use disposable batteries (such as alkaline, zinc-air), or the multiple use rechargeable batteries (such as nickel-cadmium, nickel-metal-hydride, lead-acid, lithium-ion).

Electronic devices can only be truly portable if their power sources are always available in the field. Disposable batteries have a finite capacity. One option is to carry a sufficient supply of spare disposable batteries. However, each of the electronic devices can have a different power requirement with different voltages and currents. As a result thereof, the user may be required to carry multiple different types of batteries. Further, on a long trip or mission, the user may have to carry multiple sets of backup batteries. Moreover, the used batteries create a significant waste problem because they often contain toxic chemicals such as lead or mercury. As a result thereof, in many in situations, it is not practical to carry sufficient spare batteries.

Rechargeable batteries must be near a power source to be recharged, typically, a source of 60 Hz/120V. This is generally not available in remote locations. Alternatively, dynamo style power generators have a long history of usage. However, these generators are bulky, lowpower, single voltage, single device, hard to crank, inefficient, no feedback, and/or dangerous to batteries.

In light of the above, there is the need for an efficient portable device to produce electrical energy in the field. Additionally, there is a need for a power source that can be used to generate output current and voltages to a wide range of different electronic devices with their various battery chemistries and power needs. Moreover, there is a need for a power source that is relatively easy and efficient to use and control. Further, there is a need for a power source that reduces user fatigue.

SUMMARY

The present invention is directed to power source that is powered by a user. The power source includes a housing, a stator component, a rotor component, a crank assembly, and a control system. The stator component is secured to the housing, the rotor component rotates relative to the stator component and the crank assembly is coupled to the rotor component. The crank assembly includes a crank output that is rotated by the user relative to the housing. As provided herein, rotation of the crank assembly by the user results in rotation of the rotor component relative to the stator component.

In one embodiment, the crank assembly includes a one-way drive mechanism that couples the crank assembly to the rotor component. The one-way drive mechanism inhibits rotation of the crank output relative to the rotor input when the crank output is rotated in a first rotational direction and allows for rotation of the crank output relative to the rotor input when the crank output is rotated in a second rotational direction that is opposite from the first rotational direction.

In one embodiment, the control system controls the amount of torque required to rotate the crank assembly. For example, the amount of torque required to rotate the crank is varied according to the rotational position of the crank. More specifically, when the crank assembly at a first rotational position the crank torque is different than when the crank assembly is at a second rotational position. In alternative embodiments, (i) when the crank assembly is at a first rotational position, the crank torque is at least approximately 2 percent greater than when the crank assembly is at a second rotational position, (ii) when the crank assembly is at a first rotational position the crank torque is at least approximately 5 percent greater than when the crank assembly is at a second rotational position, (iii) when the crank assembly is at a first rotational position the crank torque is at least approximately 10 percent greater than when the crank assembly is at a second rotational position, or (iv) when the crank assembly is at a first rotational position the crank torque is at least approximately 50 percent greater than when the crank assembly is at a second rotational position. In addition, the overall drag level can be set via user control so that a weaker person can select a lighter setting than a very strong person. In this fashion, drag levels can span a typical range of 200 to 500 percent from minimum to maximum level.

As provided herein, the crank torque decreases as the angular velocity decreases and the crank torque increases as the angular velocity increases. This torque versus speed relationship can be completely specified with the electronics as described below.

The power source can be manually driven. In one embodiment, the power source enables charging of electronic devices in the field while controlling the output voltage and current and maintaining constant input torque drag.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 5A is a perspective view of still another embodiment of a power source in a portable position, having features of the present invention;

FIG. 5B is a perspective view of the power source of FIG. 5A in a use position, having features of the present invention;

FIG. 6A is a perspective view of first embodiment of a power source combination having features of the present invention;

DESCRIPTION

Figure 1A:
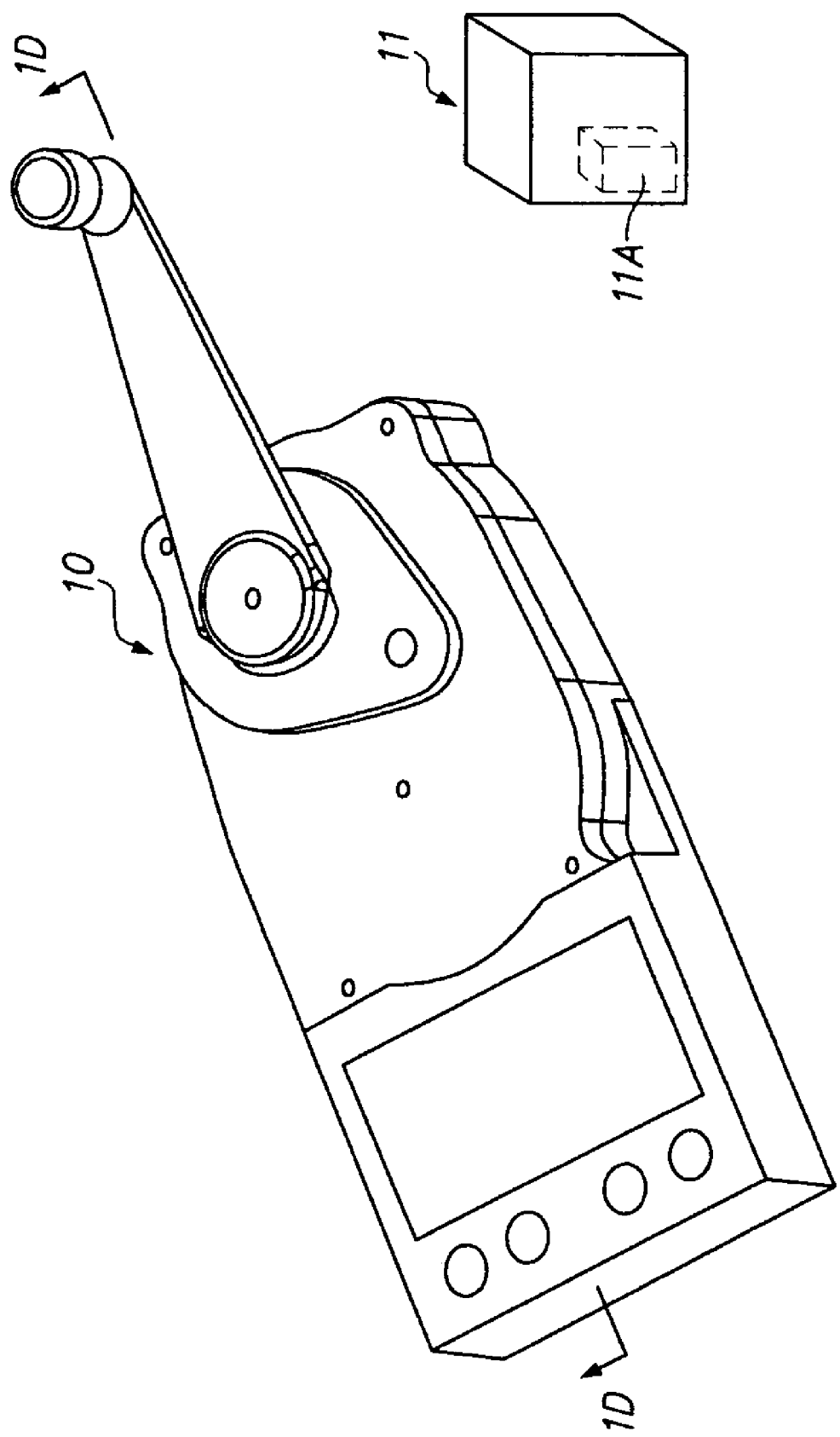
FIG. 1A is a perspective view of a first embodiment of a power source having features of the present invention and an electronic device.

FIG. 1A is a perspective view of a first embodiment of a power source 10 and an electronic device 11 or object that can be charged with the power source 10. The power source 10 can be used as a manually driven, mobile and portable generator. For example, the power source 10 can weigh less than approximately 0.2 pounds, 0.5 pounds, 1 pounds, 2 pounds, 3 pounds, 5 pounds, 10 pounds, or 20 pounds. Alternatively, for example, the power source 10 can be designed as a stationary generator 10.

The type of electronic device 11 charged by the power source 10 can vary. For example, the electronic device 11 can be portable and can include (i) communications devices such as mobile telephones, citizen band radios, family radio spectrum radio, and wireless internet devices, (ii) portable computing devices such as notebook computers, personal digital assistants, and calculators, (iii) military electronic devices, such as night visions devices, communications devices, precision GPS, laser targeting devices, data displays, and computing devices, and (iv) other items such as digital cameras, camcorders, global position satellite devices, portable electronic games, flashlights, radios, and audio CD/MP3 players. Alternatively, the electronic device can be stationary.

The electronic device 11 can be, or include a battery pack 11A (illustrated in phantom) having one or more rechargeable batteries. As provided herein, the power source 10 can be used with batteries packs 11A having different charging requirements, such as different voltage requirements and/or different current requirements.

In the embodiment illustrated in FIG. 1A, the power source 10 can be operated independently of the particular electronic device 11 being charged.

Figure 1B:
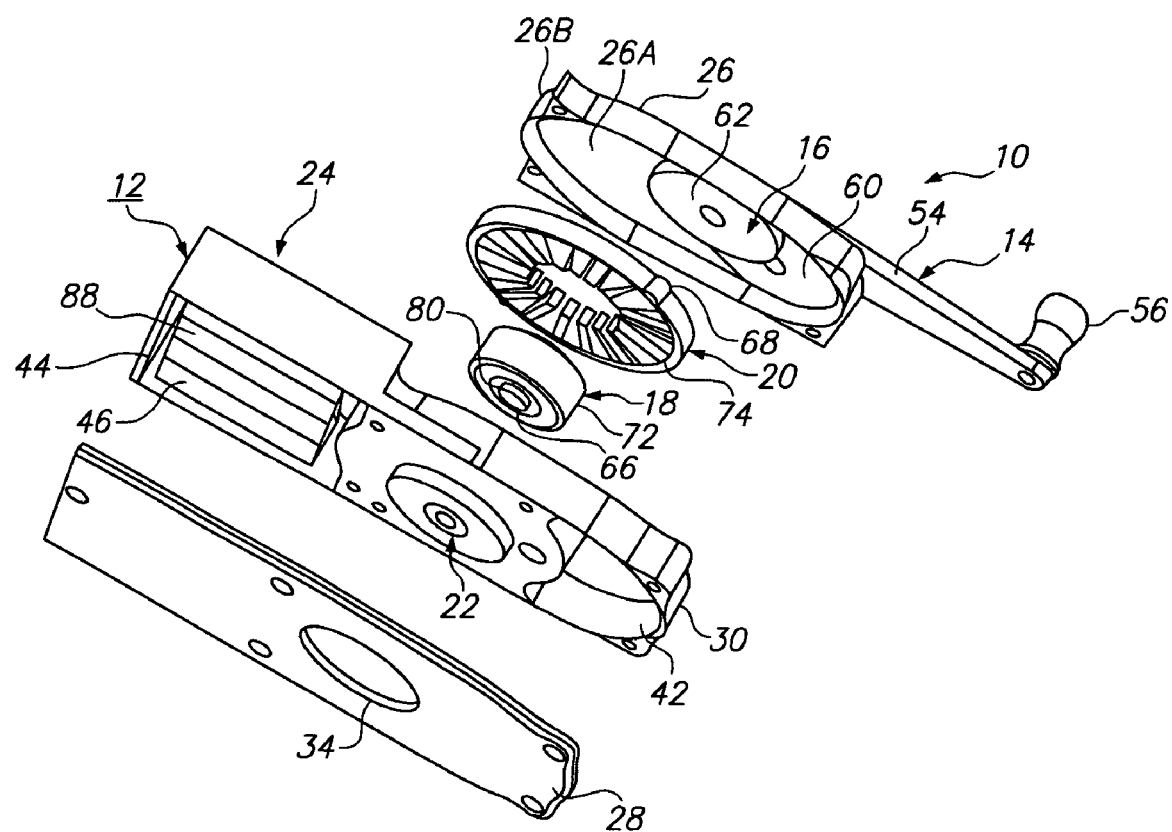
FIG. 1B is a partially exploded, first perspective view of the power source of FIG. 1A.
Figure 1C:
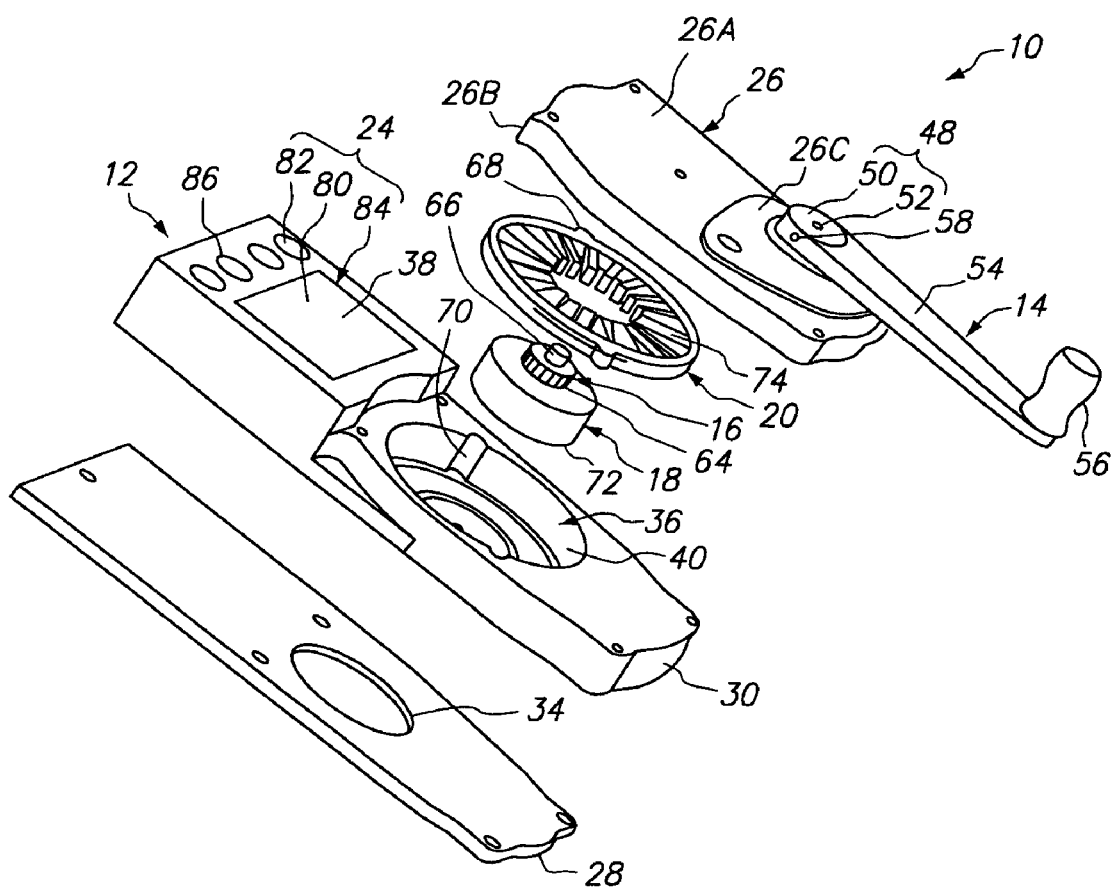
FIG. 1C is a partially exploded, second perspective view of the power source of FIG. 1B.

FIGS. 1B and 1C are partially exploded perspective views of the power source 10 of FIG. 1A. One or more of the features provided herein can be used in BLDC generators and/or SR generators. As illustrated in FIGS. 1B and 1C, the power source 10 can include (i) a housing 12, (ii) a crank assembly 14, (iii) a gear assembly 16, (iv) a rotor component 18, (v) a stator component 20, (vi) a bearing assembly 22, and (vii) a control system 24. The design of each of these components can be varied to suit the design requirements of the power source 10.

The housing 12 supports the components of the power source 10. The size and shape of the housing 12 can be varied to suit the design requirements of the power source 10. For example, the housing 12 illustrated in FIGS. 1B and 1C includes a first housing segment 26, a second housing segment 28, and a third housing segment 30. The first housing segment 26 includes a substantially planar region 26A having an outer surface and an inner surface, and a tubular region 26B that extends substantially perpendicularly away from the inner surface of the planar region 26A near a periphery of the planar region 26A. The planar region 26A further includes a raised section 26C near the end of the housing 12 away from the control system 24. The raised section 26C is stepped up away from the outer surface of the planar region 26A so that the outer surface of the raised section 26C is substantially parallel to the outer surface of the planar region 26A. The raised section 26C substantially surrounds a portion of the gear assembly 16. Near the center of the raised section 26C is a small pivot aperture (not shown) that receives a portion of the crank assembly 14. The bearing assembly 22 includes a bearing (not shown) that secures the crank assembly 14 to the housing 12 and allows the crank assembly 14 to rotate.

The second housing segment 28 is somewhat planar and rectangular shaped, and is positioned spaced apart from and substantially parallel to the first housing segment 26. The second housing segment 28 includes an aperture 34 that is substantially circular and is positioned to receive a portion of the third housing segment 30.

The third housing segment 30 includes a generator region 36 and a control region 38. The generator region 36 includes a generator cavity 40 that can be positioned at an end of the generator region 36 near the control region 38. The generator cavity 40 is sized and shaped to receive the rotor component 18, the stator component 20, and a portion of the bearing assembly 22. At an end of the generator region 36 away from the control region 38, the third housing segment 30 includes a crescent shaped cavity 42. The generator region 36 extends substantially perpendicularly between the first housing segment 26 and the second housing segment 28 near a periphery of the second housing segment 28, and is secured to the first housing segment 26 and the second housing segment 28. The generator region 36 has somewhat the same size and shape as the first housing segment 26, so that the periphery of the first housing segment 26 substantially matches the periphery of the generator region 36.

The control region 38 is substantially rectangular shaped with a cavity 44 that is sized and shaped to receive the control system 24 and a battery pack 46. The control region 38 extends substantially perpendicularly away from the second housing segment 26 and is secured to the second housing segment 28.

The first housing segment 26, the second housing segment 28 and the third housing segment 30 cooperate to substantially surround the other elements of the power source 10 exclusive of the crank assembly 14.

The first housing segment 26, the second housing segment 28 and the third housing segment 30 can be made of a suitable, rigid material. Suitable materials include aluminum, ABS plastic, and/or steel.

The crank assembly 14, when operated by a user, causes the resulting clockwise or counterclockwise rotation of the gear assembly 16. Power source 10 will work in both directions, while power source 510 shown in FIG. 5B would work best with a single direction rotation. In FIGS. 1B and 1C, the crank assembly 14 includes a pivot assembly 48 having a disc component 50 and the rod component 52, an arm 54, and a handle 56 having a handle knob and a handle pin. The disc component 50 has a substantially circular cross-section with a flat upper surface and a flat lower surface, and is positioned spaced apart from the outer surface of the raised section 26C of the first housing segment 26. The disc component 50 further includes a disc aperture that receives the rod component 52. The rod component 52 is a slender rod with a substantially circular cross-section that extends into the disc aperture and is secured to the disc component 50. The rod component 52 secures the disc component 50 to the gear assembly 16.

The arm 54, as illustrated in FIGS. 1B and 1C, has a proximal end and a distal end. The proximal end has an arced cutout that receives the disc component 50 of the pivot assembly 48. The proximal end also includes apertures near either end of the arced cutout that receive small pins 58 that extend through the apertures and into the disc component 50 to secure the arm 54 to the disc component 50. The arm 54 extends away from the pivot assembly 48 substantially parallel to and spaced apart from the outer surface of the first housing segment 26. Near the distal end, the arm 54 can also include a handle aperture that receives the handle pin and secures the handle 56 to the arm 54. Alternatively, the handle 56 can be designed without the handle pin wherein the handle knob is secured to the arm 54 with an adhesive or another type of fastener.

As noted above, the handle 56 can include the handle knob and the handle pin. The handle knob is shaped so that it can easily be gripped by the user and operator of the crank assembly 14. The handle 56 is designed so that it can easily be gripped with either the left hand or the right hand of the user for the convenience of the user. The arm 54 rotates about the pivot assembly 48 when the user applies a force to the handle 56 in a direction substantially perpendicular to the arm 54 and substantially parallel to the outer surface of the first housing segment 26. The power source 10 is designed so that the arm 54 can rotate about the pivot assembly 48 in a clockwise or a counterclockwise (when look down at the first housing segment 26) direction to generate power. The particular direction of rotation of the arm 54 about the pivot assembly 48 depends on the ease and convenience of the user.

The gear assembly 16 mechanically couples the crank assembly 14 to the rotor component 18. The gear assembly 16 can have a gear ratio of the input to output of 1:1, greater than 1:1, or less than 1:1. For example, with the design provided herein, the gear assembly 16 can have a gear ratio of between approximately 3:1 and 16:1. For example, in alternate embodiments, the gear assembly 16 can have a gear ratio of approximately 4:1, 5:1, 6:1, 7:1, 8:1, 9:1, 10:1, 11:1, 12:1, 13:1, 14:1, or up to 25:1. The power source 10 provided herein is a high energy density generator that allows for the use of a lower gear ratio, therefore resulting in lower stresses and wear on the mechanical elements such as gear teeth and bearing assembly 22. This benefit further results in lower cost and longer system life.

The rod component 52 of the crank assembly 14 extends through the raised region 26C of the first housing segment 26 and is secured to the gear assembly 16. In FIG. 1B, the gear assembly 16 includes a first gear 60, a second gear 62 and a third gear 64. The first gear 60 is secured with the rod component 52 to the disc component 50. The first gear 60 is positioned substantially parallel to and spaced apart from the inner surface of the raised section 26C of the first housing segment 26. As the user inputs a force to the handle 56 of the crank assembly 14, the arm 54 of the crank assembly 14 rotates about the pivot assembly 48. As the arm 54 rotates about the pivot assembly 48, the pivot assembly 48 and, more specifically, the rod component 52 also rotates. The rotation of the rod component 52 further causes the first gear 60 to rotate. The first gear 60 is enmeshed with the second gear 62 so that the rotation of the first gear 60 causes the second gear 62 to rotate in the opposite direction. The second gear 62 is enmeshed with the third gear 64 so that the rotation of the second gear 62, in turn, causes rotation of the third gear 64. The third gear 64 is secured to the rotor component 18. As a result thereof, rotation of the third gear 64 results in rotation of the rotor component 18.

Alternatively, the power source 10 can be designed so that the crank assembly 14 directly drives the rotor component 18. In this embodiment, the power source 10 does not include the gear assembly 16. Still alternatively, the gear assembly 16 can include more than three or less than three gears.

The rotor component 18 and the stator component 20 cooperate to convert mechanical energy from the rotation of the crank assembly 14 to electrical energy. In FIGS. 1B and 1C, the rotor component 18 is somewhat disk shaped and includes a pair of rotor pins 66 that extend along the central axis of the rotor component 18 from either end of the rotor component 18. The rotor pins 66 are spaced apart from each other, essentially forming a discontinued line along the central axis of the rotor component 18. The rotor component 18 rotates about the rotor pins 66.

The stator component 20 is substantially ring shaped and substantially encircles the rotor component 18. The stator component 20 further includes at least one bump 68 along an outer edge that fits into at least one indentation 70 along the outer edge of the generator cavity 40. As shown in FIGS. 1B and 1C, the stator component 20 can include two bumps 68 that interact and fit into two indentations 70 in the generator cavity 40 to inhibit rotation of the stator component 20. Alternatively, the stator component 20 can include more than two or less than two bumps 68, and the generator cavity 40 can include more than two or less than two indentations 70. Also alternatively, the stator component 20 can include one or more indentations 70 that coincide with one or more bumps 68 in the generator cavity. Still alternately, the stator component 20 can be secured to the housing 12 in another fashion.

In an alternative embodiment of the present invention, the positions of the rotor component 18 and the stator component 20 can be reversed so that the rotor component 18 is substantially ring shaped and substantially encircles the stator component 20.

As provided herein, one of the rotor component 18 and the stator component 20 includes a magnet array 72 having one or more magnets and the other of the stator component 20 and the rotor component 18 includes one or more turns of wire 74. The multiple turns of wire 74 can be made of copper or another electrically conductive material that is embedded in an epoxy or another type of adhesive, the purpose of which is to reduce acoustic noise and improve thermal heat dissipation.

In FIGS. 1B and 1C, the stator component 20 includes the multiple turns of wire 74, and the rotor component 18 includes the magnet array 72. Alternately, the power source 10 may be designed so that the stator component 20 includes the magnet array 72 and the rotor component 18 includes the multiple turns of wire 74.

The bearing assembly 22 supports the rotor component 18 and the gear assembly 16 relative to the housing 12 and allows the rotor component 18 and gear assembly 16 to rotate relative to the housing 12. In FIGS. 1B and 1C, the bearing assembly 22 includes multiple, spaced apart bearings 80.

The control system 24 controls charging of the electronic device 11 (illustrated in FIG. 1A). In one embodiment, the control system 24 controls the torque at the crank assembly 14 that is experienced by the user. In one embodiment, the control system 24 constantly monitors the input and output parameters of the power source 10 and provides visual feedback to the user as to the progress of the power generation process. Depending upon the embodiment, the control system 24 can perform one or more of the features of (i) adjusting the torque experienced by the user during rotation of the crank assembly 14, (ii) automatic detection of the load voltage required to charge the electronic device 11, (iii) allow for the hookup of multiple power sources 10 to charge the electronic device 11, (iv) detect and configure to charge various custom battery types, (v) dynamically adjust the output voltage, (vi) dynamically adjust the output current, and/or (vii) dynamically maintain a rotational velocity of the rotor component.

In one embodiment, the control system 24 includes a display 80, a user input 82 and a control board 84 (illustrated in phantom). The display 80 can display one or more of the functions of the power source 10. For example, the display 80 can display one or more of the features (i) the rate of charging of the electronic device, e.g. somewhat similar to a gas gage for a car, (ii) the estimated additional time required to charge the electronic device, (iii) the battery type of the electronic device being charged, (iv) voltage, amps, watts being delivered to the device/battery, (v) minutes of device usage stored such as talktime on a cellphone, (vi) battery temperature, state-of-health, (vii) moving graphic to help user maintain optimum cranking pace and/or (viii) that the device is fully charged.

In one embodiment, the display 80 is a liquid crystal display. Alternatively, for example, the display 80 can include one or more gages or other type of monitors such as LEDs.

The user input 82 allows the user to communicate instructions to the control board 84 as well as to the display 80. For example, the user input 84 allows the user to specify the required charging conditions and termination conditions by specifying particular voltages, output power, etc., or by selecting among several previously defined battery types or electronic devices (ex: cellphone types). Further, the user input 82 can allow the user to adjust desired crank torque drag up or down for the convenience of the individual user.

In the embodiment illustrated in FIG. 1C, the user input 82 includes a plurality of buttons 86 that are electrically connected to the control board 84. The user can depress and/or move the buttons 86 to give instructions to the control board 84. Alternatively, for example, the user input 82 can include one or more knobs or the user input 82 can be voice activated.

The control board 84 acts as the central component of the power source 10, coordinating all monitoring, control, and status display functions. Further, the control board 84 can perform the functions of the control system 24 described above. In one embodiment, the control board 84 firstly accepts the input from the user with the user input 82 specifying the target battery charging requirements of voltage and current, and termination conditions of voltage, NDV or temperature for the electronic device 11. This feature allows the power source 10 to accommodate many different voltages, currents, etc. of the many types of battery chemistries. Additionally, commands such as desired crank drag are specified here. The functions of the control board 84 are described in more detail below.

In one embodiment, the power source 10 includes the internal battery pack 46. This allows for more rapid human energy input than many small portable devices can accept. Additionally, the internal battery pack 46 can accommodate more rapidly fluctuating voltages and currents than would be tolerated by many electronic devices 11. The power source 10 can also include a bypass circuit so that even if the internal battery pack 46 is dead, the power source 10 can still charge the electronic device 11. As provided herein, the battery pack 46 can include one or more rechargeable batteries 88, such as nickel-cadmium, nickel-metal-hydride, lead-acid, and/or lithium-ion.

Figure 1D:
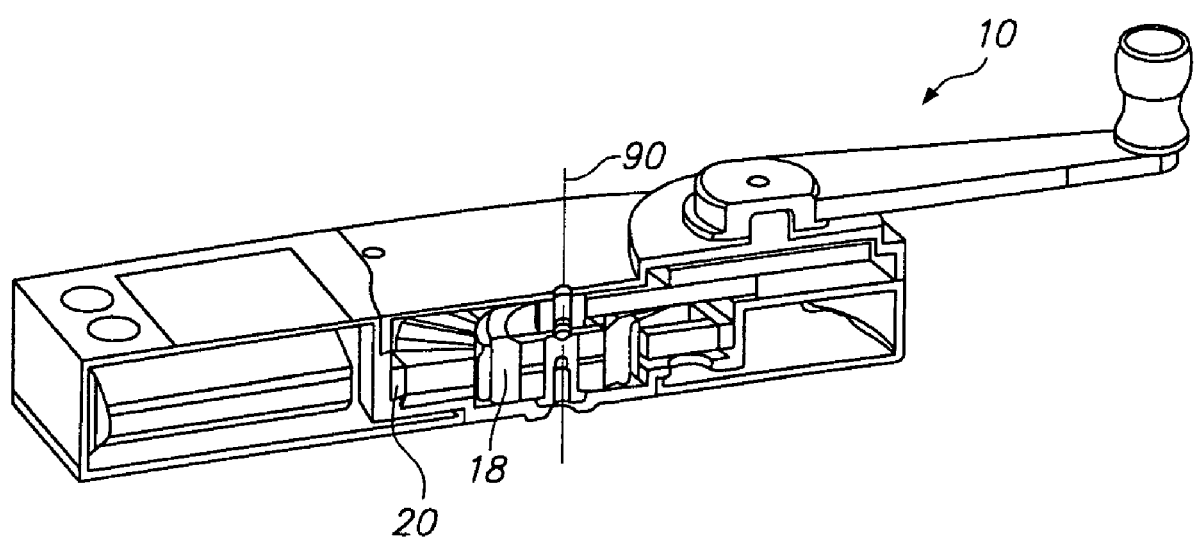
FIG. 1D is a cross-sectional view taken on line 1D—1D in FIG. 1A.

FIG. 1D is a cut-away view of the power source 10. FIG. 1D illustrates that the rotor component 18 and the stator component 20 are concentric to each other. The rotor component 18 rotates about a central axis 90 while the stator component 20 remains stationary. Equivalently, the order could be reversed with the rotor spinning external to the stator.

Figure 2A:
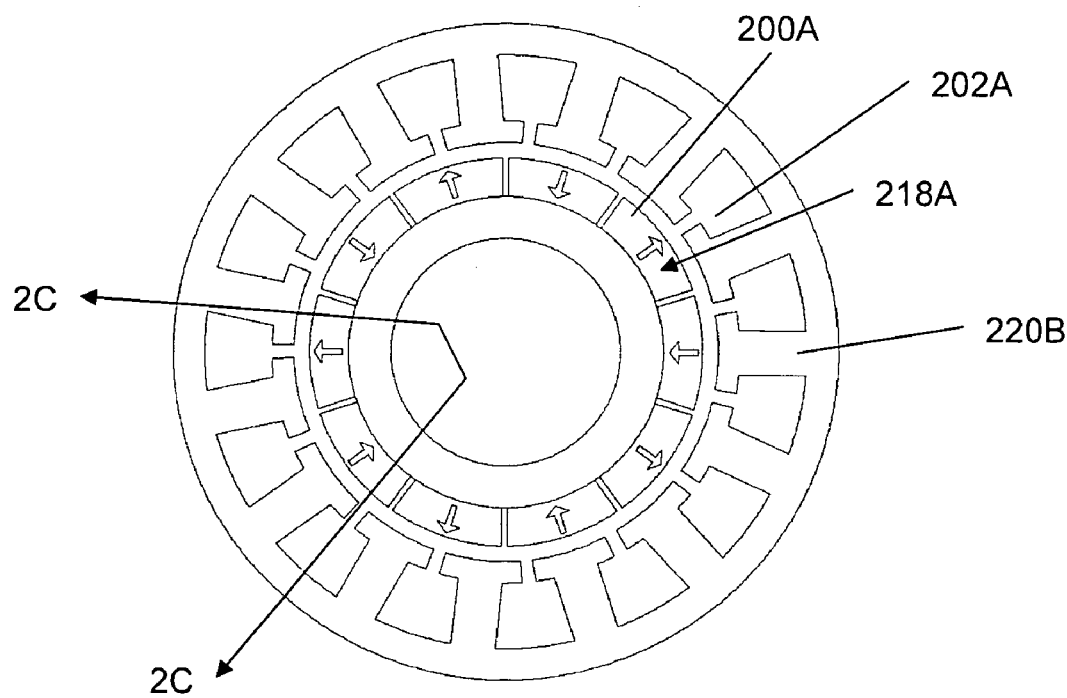
FIG. 2A is a top view of a stator component and a rotor component having features of the present invention.

FIG. 2A is a top view of a stator component 220A and a rotor component 218A that can be used in the power source 10 of FIG. 1A. In this embodiment, the rotor component 218A includes 10 poles 200A and the stator component 220A includes 15 slots 202A. Thus, the slot/pole ratio is 15/10. Stated another way, the pole/slot ratio has a common factor. For 3 phase generators, the number of slots and the number of poles having a common factor can be wound with a simple ABCABC . . . pattern where A,B,C refer to the 3 winding phases, and uppercase letters refers to winding coils clockwise around each tooth shank. A lower case letter indicates winding a coil counter-clockwise around each tooth shank. Other examples of slot/pole ratios include 9slot/12pole, 9slot/6pole, and 6slot/8pole. These examples have the virtue of an obvious winding pattern—ABCABC . . . with all teeth wound clockwise, and each $3^{rd}$ tooth belonging to the same phase. However, common factor pole/slot ratio generators can have relatively high cogging torques.

Figure 2B:
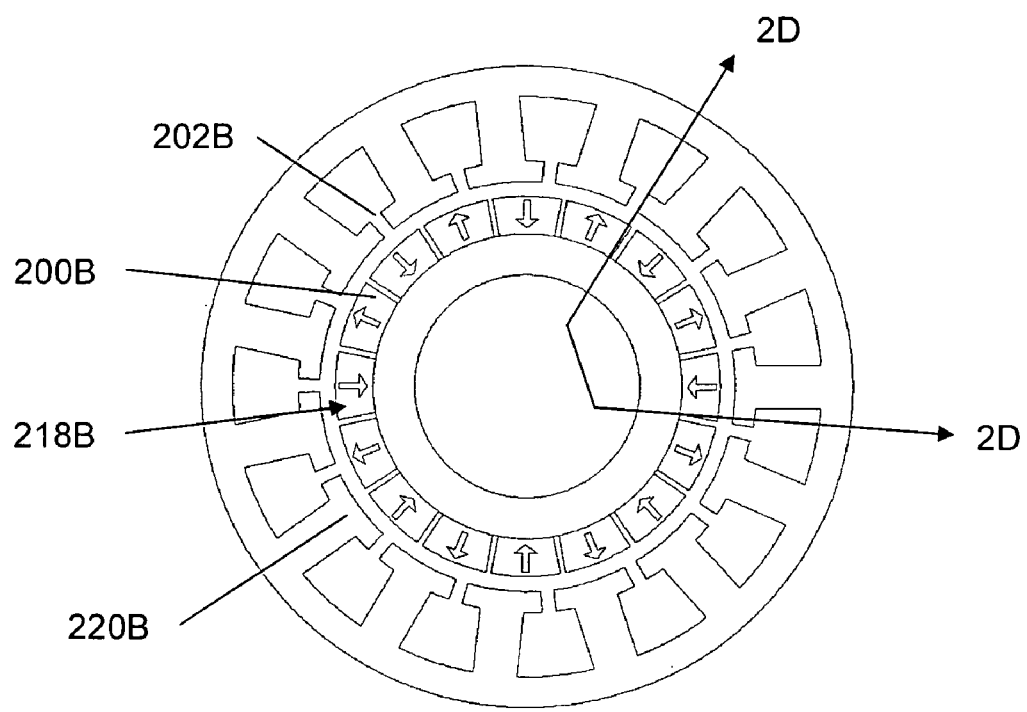
FIG. 2B is a top view of another embodiment of a stator component and a rotor component having features of the present invention.

FIG. 2B is a top view of another embodiment of the stator component 220B and the rotor component 218B that can be used in the power source 10 of FIG. 1A. In this embodiment, the rotor component 218B includes 16 poles 200B and the stator component 220B includes 15 slots 202B. Thus, the slot/pole ratio is 15/16. Further, the least common multiple of this design is 240. Stated another way, the pole/slot ratio does not have a common factor that evenly divides into the number of poles or slots and the power source has a fractional pole/slot ratio. In this embodiment, the winding pattern can be AaAaABbBbBCcCcC where the uppercase letters refers to winding coils clockwise around each tooth shank and the lower case letters indicate winding a coil counter-clockwise.

Alternatively, the stator component 220B and the rotor component 218B can be designed with fractional pole slot ratios, such as 15slot/14pole, 9slot/8pole, 9slot/10pole, 21slot/18pole, or 21slot/20pole. These examples have a least common multiple of 210, 72, 90, 378, or 420 respectively.

The fractional pole/slot ratio designs can have a smaller cogging torques than common factor pole/slot ratio designs. Additionally, the lack of a common factor and a relatively high least common multiple reduces the magnitude and increases the frequency of the cogging cycles. This results in very smooth motion and rotation of the crank assembly.

Further, the stator component 220B and the rotor component 218B illustrated in FIG. 2B have a pole/slot ratio that is very close to 1. Higher strength generators occur when the pole/slot ratios are closest to 1, because this maximizes rotor/stator magnetic coupling. Examples of suitable alternative pole/slot ratios have a value of approximately 0.7; 0.8; 0.9; 1; 1.1; 1.2; and 1.3.

As provided herein, high vibration and low generator strength can be avoided by using pole/slot ratios with no common factors, and having pole/slot ratios close to 1. Further, these features can inhibit "cogging", e.g. relatively large uncomfortable torque vibrations to the user when cranking that can also cause high acoustic noise.

Figure 2C:
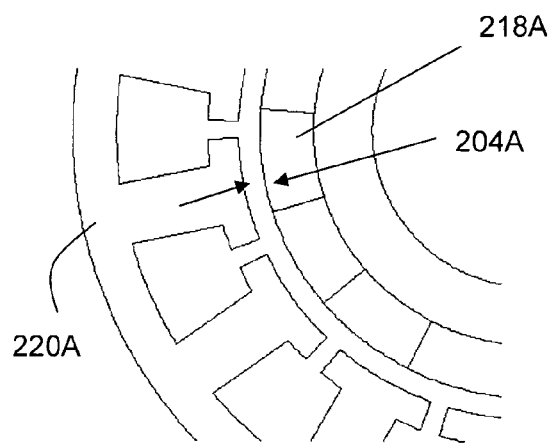
FIG. 2C is a cut-away view taken on line 2C—2C in FIG. 2A.

FIG. 2C is a cut-away view of the stator component 220A and the rotor component 218A of FIG. 2A. FIG. 2C illustrates that the outer circumference of the rotor component 218A is spaced apart from the inner perimeter of the stator component 220A by a radial component gap 204A that is filled with air. In this embodiment, the radial component gap 204A is substantially constant.

Figure 2D:
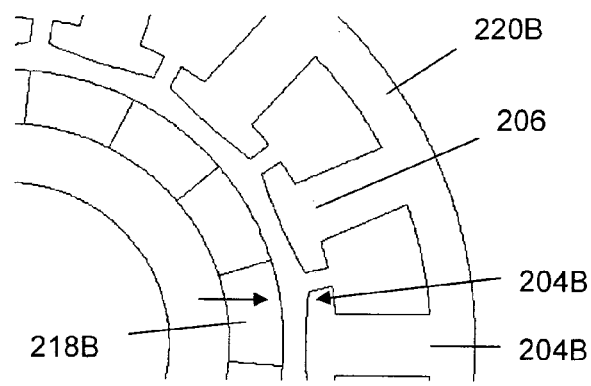
FIG. 2D is a cut-away view taken on line 2D—2D in FIG. 2B.

FIG. 2D is a cut-away view of the stator component 220B and the rotor component 218B of FIG. 2B. FIG. 2D illustrates that the outer circumference of the rotor component 218B is spaced apart from the inner perimeter of the stator component 220B by a radial component gap 204B that is filled with air. In this embodiment, the component gap 204B varies around the circumference of the rotor component 218B. For example, in this embodiment, the profile of the tooth head 206 of the stator component 220B adjacent to the rotor component 218B is such that the radial component gap 204B is smallest at the center of each tooth 206 and widest near the edges of each tooth.

As an example, the component gap 204B can vary approximately 5%, 10%, 20%, 30%, or 50%. Stated another way, in alternative embodiments, the radial component gap 204B can have (i) a minimum component gap at the tooth center of approximately 0.2 mm and a maximum component gap at the tooth edges of approximately 0.35; (ii) a minimum component gap at the tooth center of approximately 0.5 mm and a maximum component gap at the tooth edges of approximately 0.8 mm; (iii) a minimum component gap at the tooth center of approximately 0.15 mm and a maximum component gap at the tooth edges of approximately 0.25 mm; or (iv) a minimum component gap at the tooth center of approximately 1.0 mm and a maximum component gap at the tooth edges of approximately 1.5 mm.

In this embodiment, the distal end of each tooth forms a somewhat curved, e.g. convex surface.

As provided herein, by varying the airgap between the rotor component 218B and stator component 220B, the amount of cogging experienced by the user for a particular rotor and stator design is reduced.

An additional design feature available for both BLDC generators and SR generators is to include a stator airgap to be both radial and axial. This can be accomplished with partially interdigitated lam and rotor component iron throughout the z-height, or only on the top and bottom ends In another embodiment, the stator component and the rotor component can create higher frequency magnetic fluctuation by notching. This causes faster cycle speeds that result in higher generated energy. In some cases, this may allow the gear assembly to be eliminated entirely independent of whether a BLDC generator or a SR generator is being used.

Figure 2E:
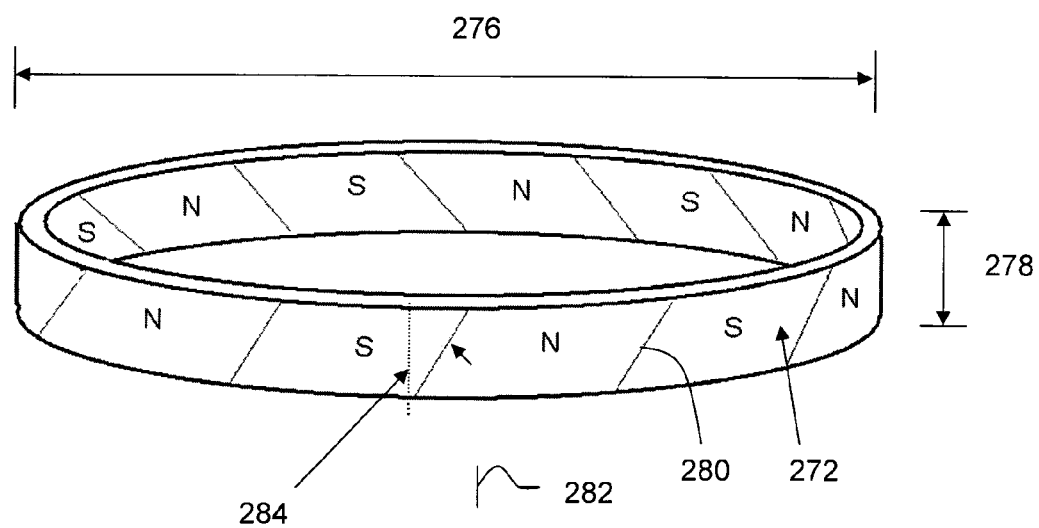
FIG. 2E is a perspective view of one embodiment of a magnet array having features of the present invention.

FIG. 2E is a perspective view of one embodiment of a magnet array 272 that can be used in the rotor component. In this embodiment, the magnet array 272 includes a single multiply magnetized permanent magnet constructed to form alternating north and south poles. The magnet array 272 can use high energy sintered NdBFe with strengths of between approximately 40–50 MGOe. Alternatively, the magnet array 272 can have strengths of between approximately 30–60 MGOe, 30–50 MGOe, or 40–60 MGOe. This very strong magnet material allows the power source 10 to be very compact in size, but requires special features to accomplish maximum electrical output in minimum physical volume.

In FIG. 2E, the single-piece cylindrical magnet ring magnet array 272 is magnetized so that the transition 280 between adjacent north poles (N) and south poles (S) is skewed. Stated another way, the magnet array 272 is centered about a magnet axis 282 and the transition 280 is at an angle 284 relative to the magnet axis 282. For example, the angle can at least approximately 5, 10, 15, 20, 25, 30, 35, 40, 45, 50, 55, or 60 degrees.

In an alternate embodiment, the magnet array can include multiple discrete magnets that are secured together into an annular shaped ring.

Additionally, the magnet array 272 can have unique dimensions where the outside diameter 276 is much larger than the height 278 of the magnet array 272. In alternative embodiments, the magnet array 22 has a ratio of outside diameter 276 to height 278 of at least approximately 2.5:1, 3:1, 4:1 or 5:1.

With the internal rotor component 18, this relationship can accommodate shaft bearings whose z-height is below the lam stack height. This is in contrast to generators that are typically 2:1 with shaft bearings above and below the stator lams reducing this ratio to 1:1 or less.

Referring back to FIG. 2B, rotation of the rotor component 218B causes the magnetic fields created by the magnet poles of the rotor component 218B to pass through the multiple turns of wire of the stator component 220B. The passage of the wire through the magnetic field created by the magnet poles of the magnet array 272 causes a fluctuating magnetic flux to pass through the stator component 218B, which induces fluctuating voltages in the multiple turns of stator wire according to Faraday's Law. The magnitude of and frequency of the induced phases' fluctuating voltages depends on the strength of the flux and frequency of passage through the magnet poles. Higher pole strengths and faster passage of the multiple turns of wire through the alternating north and south poles produces proportionally higher generated voltages and higher possible electrical energy production.

For a generator the efficiency ($\eta$) of governed by the following formulas:

$$\eta = \frac{Z}{1+Z}$$

$$P = Km^2 G^2 W^2 \frac{Z}{(1+Z)^2}$$

Where P is power out [watt], Z is load/generator impedance ratio, W is handle speed [rad/s], G is the gear ratio, and Km is the motor constant [V–S/$\sqrt{\Omega}$].

Figure 3A:
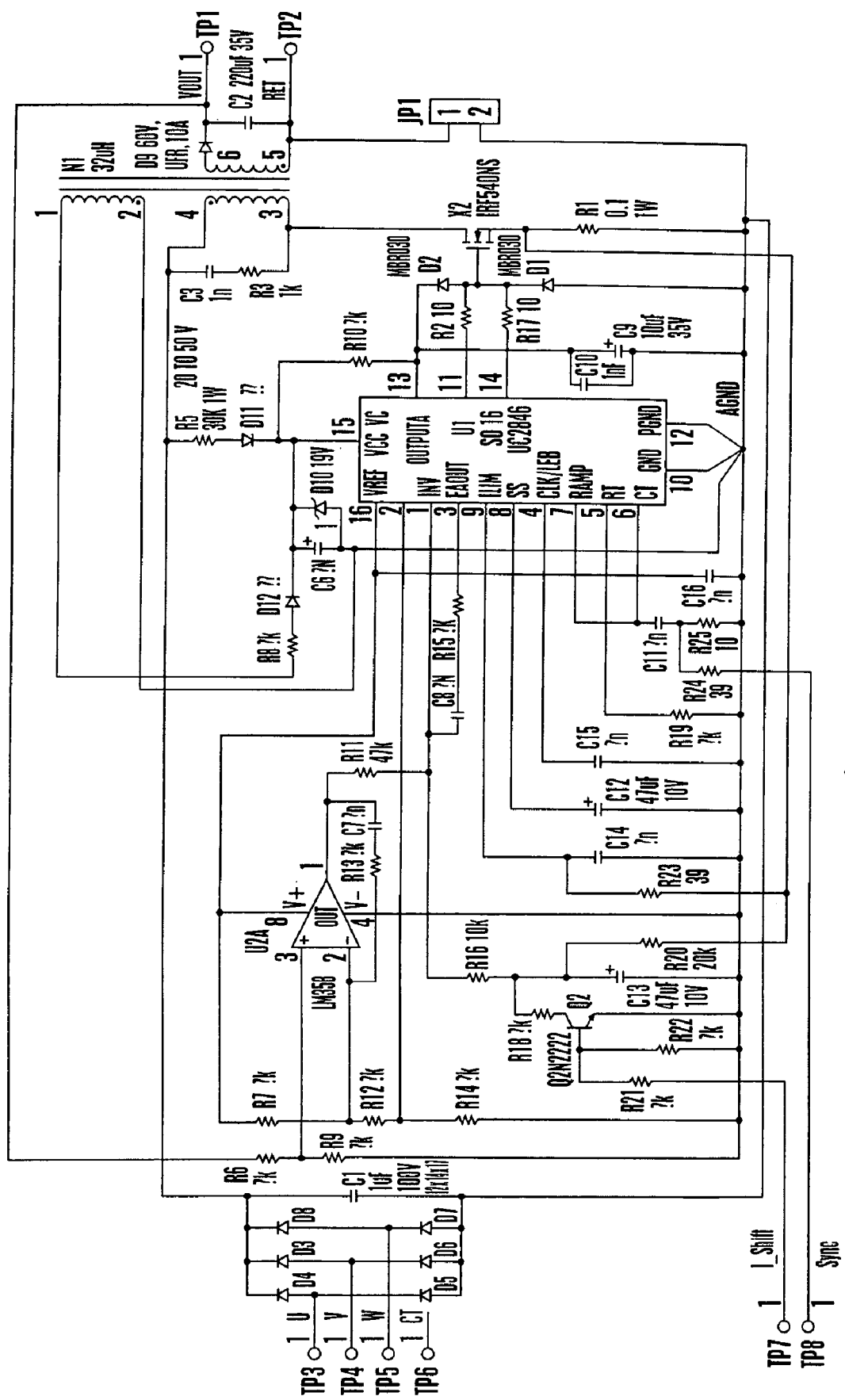
FIG. 3A is a diagram of a flyback converter having features of the present invention.
Figure 3B:
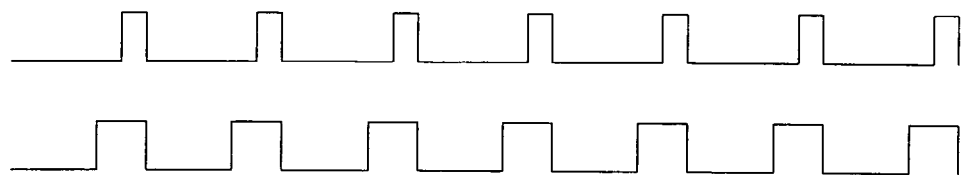
FIG. 3B is a diagram of a switching converter having features of the present invention.
Figure 3F:
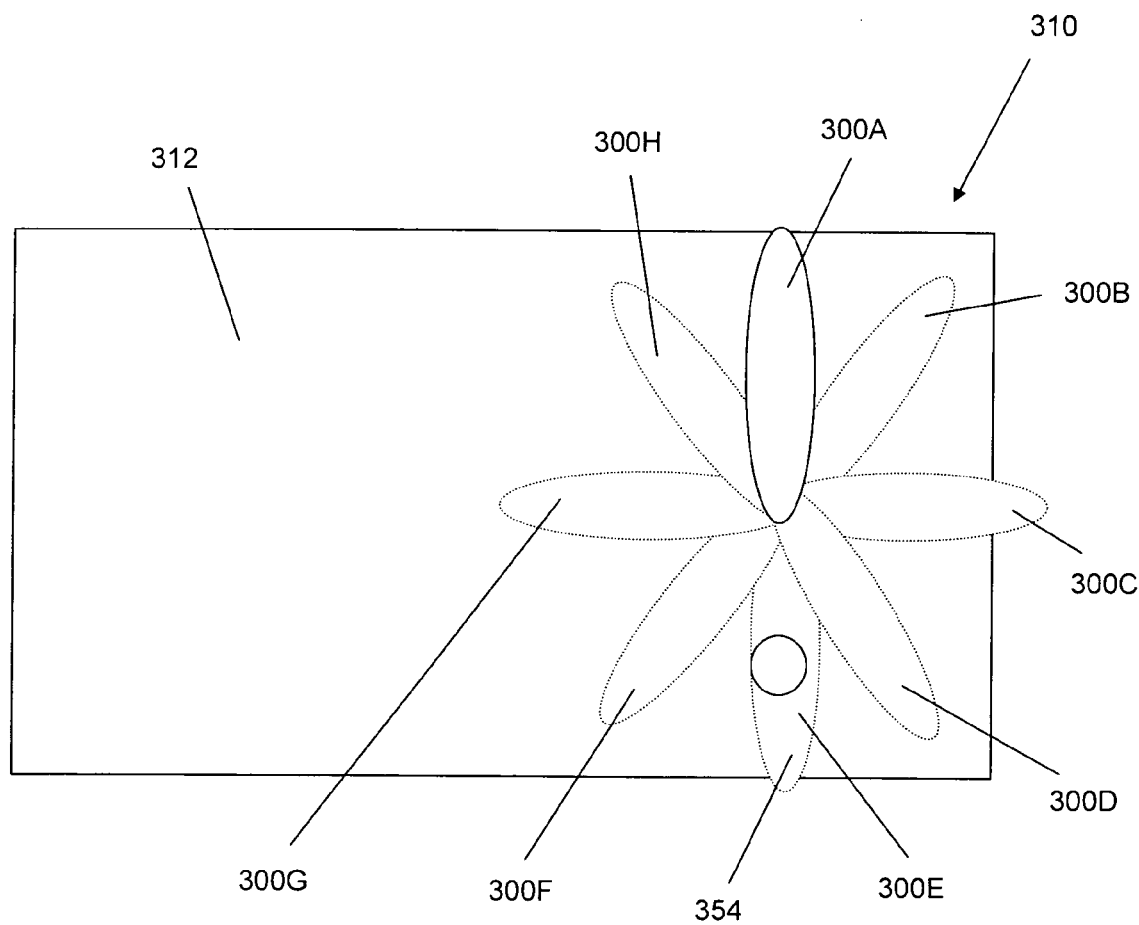
FIG. 3F is a simplified illustration of a power source having features of the present invention.
Figure 3C:
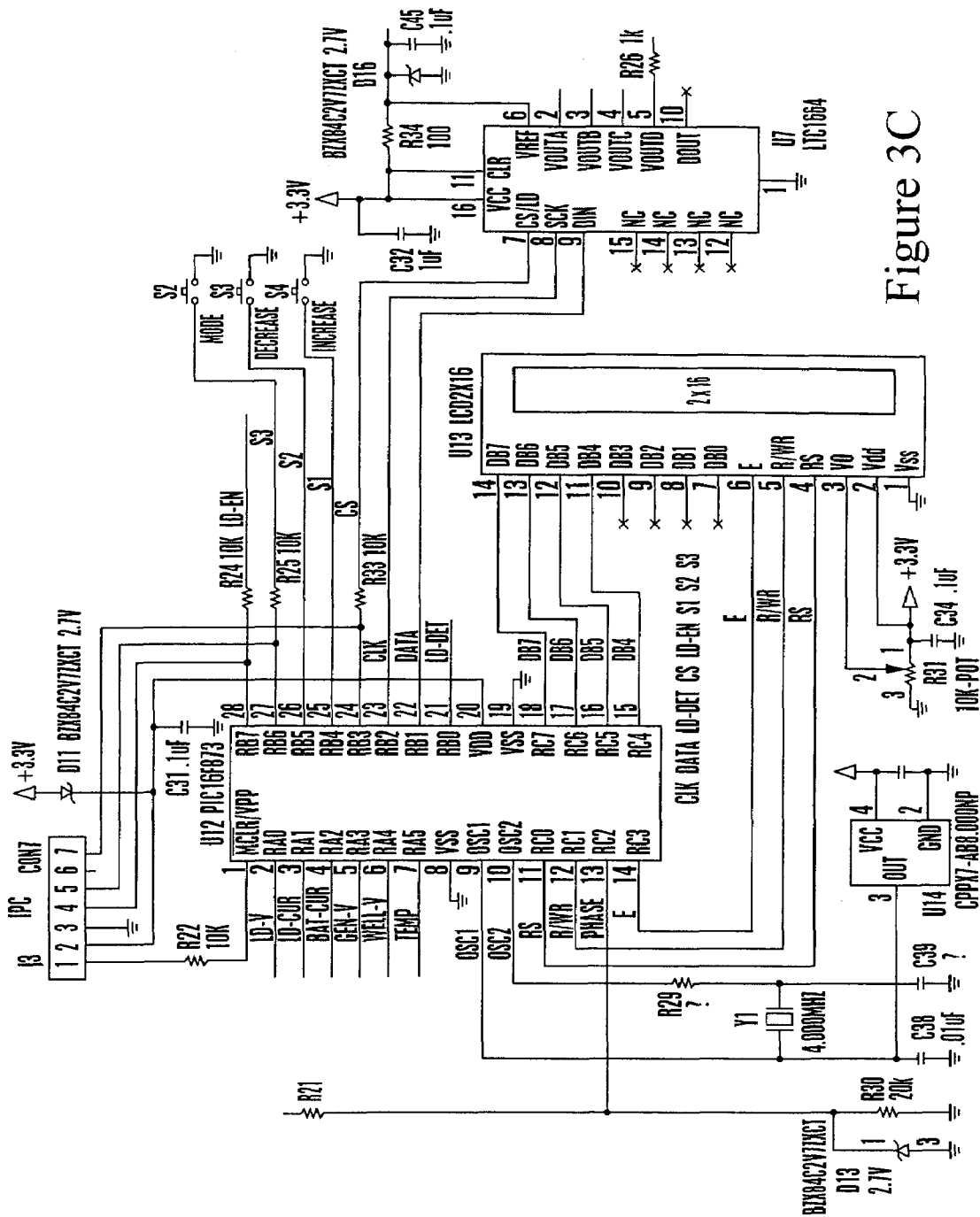
FIG. 3C is a diagram of a microprocessor controller having features of the present invention.
Figure 3D:
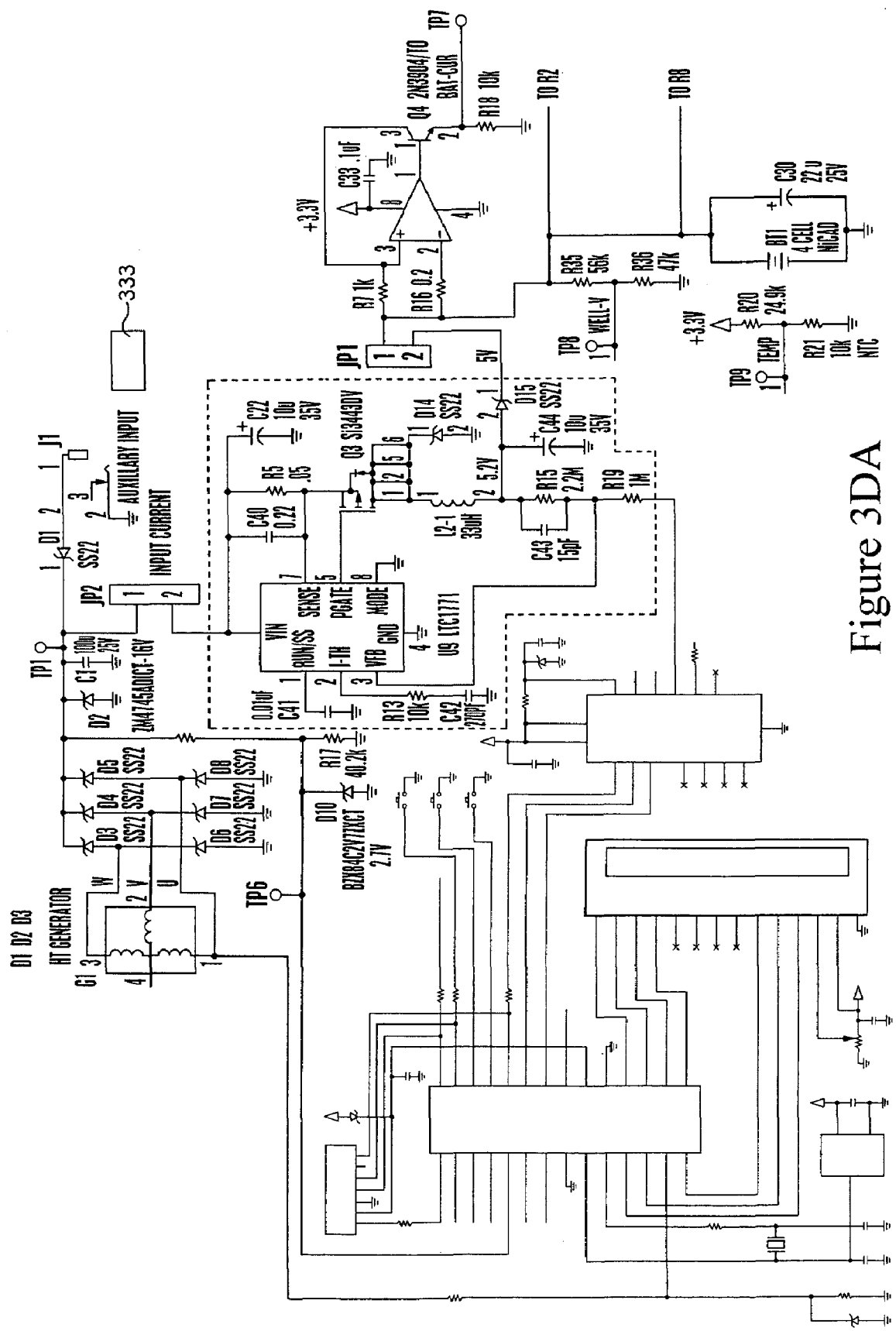
FIG. 3D is a buck stage followed by a SEPIC stage and microprocessor having features of the present invention.
Figure 3D:
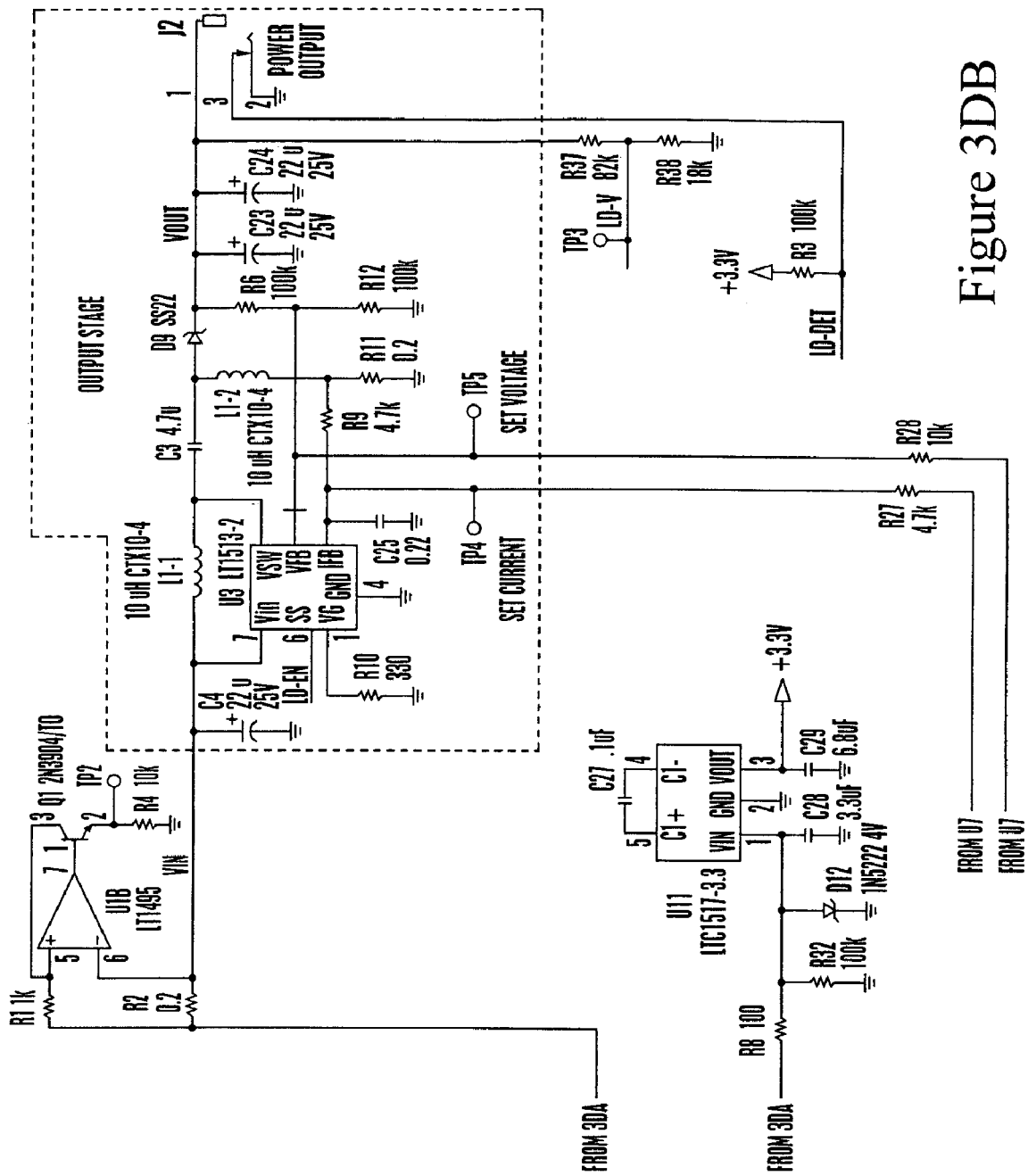
Figure 3E:
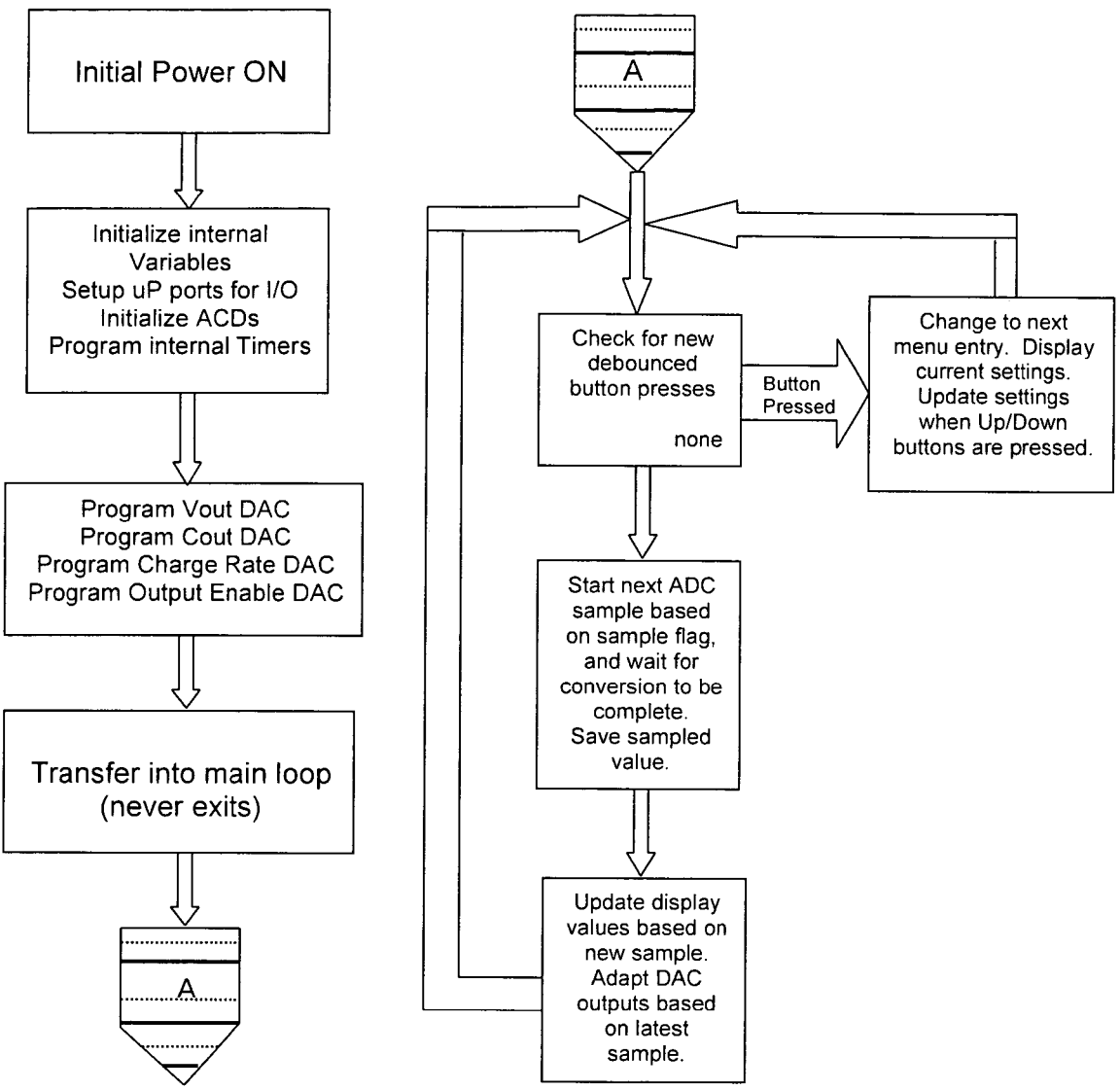
FIG. 3E is a firmware flowchart having features of the present invention.
Figure 3G:
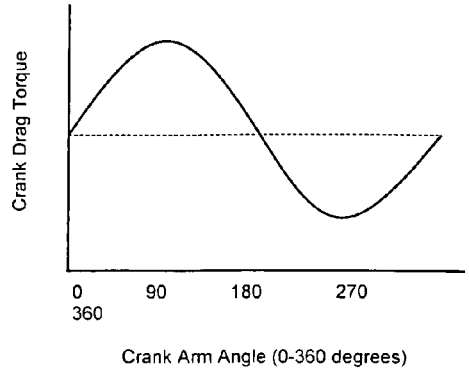
FIG. 3G is a graph that illustrates drag torque versus arm angle for another embodiment of the power source at a constant RPM.
Figure 3H:
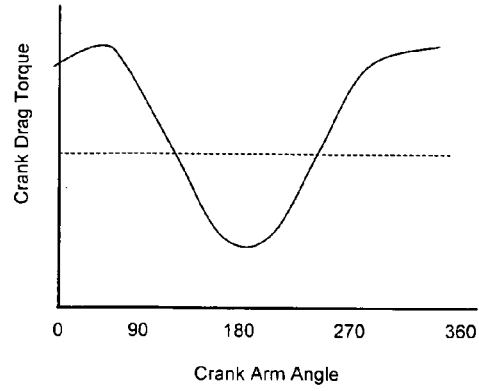
FIG. 3H is a graph that illustrates drag torque versus arm angle for one embodiment of the power source.
Figure 3I:
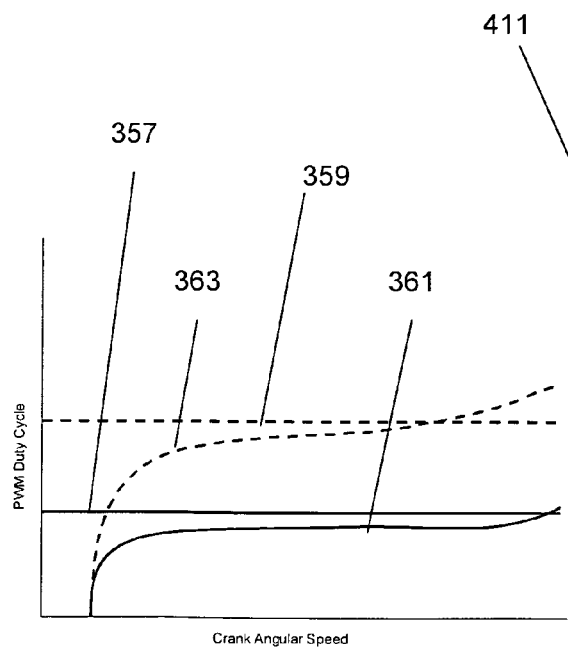
FIG. 3I is a graph that illustrates a variety of possible duty cycle versus rotor/crank arm speed curves.

FIG. 3I illustrates a variety of possible duty cycle versus rotor/crank arm speed curves. In one embodiment, a constant duty cycle could be implemented. This is illustrated as straight line 357 in FIG. 3I. With a single-stage flyback converter, this would result in a crank torque that gets harder as the crank arm is turned faster. The user could select a different similar duty cycle curve. This is illustrated as straight line 359 in FIG. 3I. In this case, a similar profile of the crank torque which gets harder at higher speeds would be obtained. But the overall levels at all speeds would be harder. This is similar to selecting a higher bicycle gear ratio. The curved profile 361 of FIG. 3I illustrate that any shape curve can be implemented offering better ergonomics than a single constant duty cycle. In a similar fashion, another similar curve 363 could be user-selected offering a higher overall level of effort. It is to be understood that more than just 2 curves per family could be easily implemented and selected by the user.

The present invention utilizes a relatively low gear ratio (G) and a relatively high motor constant (Km). As provided herein, the power source 10 has a motor constant (Km) of at least approximately 50e-3, 70e-3, 100e-3, or 200e-3 [V–S/sqrt(ohm)].

In one embodiment, the control board 84 (illustrated in FIG. 1C) includes a first data path, a second data path, a third data path, a fourth data path, a plurality of sensors, a first converter and a second converter.

In one embodiment, the first converter rectifies the AC phase voltages to a positive voltage, e.g. DC. This can be accomplished through use of a simple diode bridge used for BLDCMs, or an actively driven and switched transistor array used for SRMs. The fluctuating, rectified voltage is a direct and unavoidable result of the varying crank speed produced by the user. While the human input energy produces fluctuating voltage, the target batteries to be charged typically require precise constant voltage. Stated another way, the second converter allows the generator to dynamically adjust the output voltage, the level of electrical energy delivered to the load, and/or the output current to dynamically adjust the torque required to rotate the crank assembly 14.

In one embodiment, the second converter is a switching DC-to-DC converter that can convert an input DC voltage to an output DC voltage by varying the duty cycle of a pulse train (a pulse width modulator or PWM). The second converter helps enable the generator to directly charge the electronic device at any required voltage or current levels.

One example of a suitable second converter is a Buck-Boost-type converter that can be used to produce output voltage equal to negative D/(1–D) times the input voltage. D is the duty cycle of the PWM switch, which would be 0.25 if the switch were on for ¼ the time and off for ¾ of the time. This feature can be taken advantage of so that if the human input voltage varies, the duty cycle D of the PWM can be varied and still produce any constant or varying output voltage above or below the input voltage that is desired to drive the target battery load voltage.

A non-dual stage analog convertor is also possible. FIG. 3A illustrates an example of a single stage flyback convertor. It displays several useful properties as already discussed. It converts voltage according to nD/(1–D), where n is the transformer turns ratio. It is capable of delivering power to a load that may be above or below the input generator voltage. When driven with a constant duty cycle PWM waveform as in FIG. 3B, it has the desirable characteristics that more current will be driven if the crank assembly is turned faster, and less current will be driven as the crank assembly is turned slower. This means that faster cranking will increase the torque, while slower cranking will reduce it, just as desired for comfort. With this design, even at slow cranking speeds, the battery will still be charging and directly driving into a battery. This contrasts with simple diode bridge rectifiers which only charge loads when the input crank speeds are high enough to generate a voltage above the battery load voltage. The PWM wave form illustrated in FIG. 3B is at constant frequency, but need not be.

In an alternative embodiment, a full-wave rectification technique is utilized. With this design, charging stops when the power source is turned too slowly to produce voltage higher than the battery stack.

Additionally, the effort required at any crank assembly rotational speed can be increased by changing the duty cycle to the convertor as illustrated in FIG. 3B. At a higher duty cycle, the torque will increase or decrease according to crank assembly speed, as before. But the overall levels will be higher than before. This enables torque control somewhat similar to changing gears on a bicycle. Furthermore, fine tuning the PWM duty cycle as the crank assembly is turned through its 360 degrees can give higher drag during strong parts of the stroke, and lower drag during weaker parts of the stroke.

Varying PWM duty cycles can be produced by a microprocessor arrangement as illustrated in FIG. 3C. The RPM of the power source and crank handle as well as its position can be read for example by sampling the voltage at a single generator phase as shown. And appropriate output voltage levels can be sent to oscillators to generate PWM signals and enable/reset convertor chips as shown. Additionally, reading user input and driving displays is also readily implemented as shown.

FIG. 3D illustrates a dual stage convertor with microprocessor control. The first stage is a buck stage that reduces the input generator voltage to a controlled lower value to charge a super cap or internal battery well. The power is then passed to a SEPIC switching convertor than drives loads above or below the intermediate stage voltage. It has similar capabilities of altering the crank drag torque when driven by different duty cycles as seen in FIG. 3C.

FIG. 3D also illustrates that the control system can include an auxiliary electrical input that allows electrical energy from an additional power source 333 to be inputted into the circuit shown, instead or in addition to the manually-driven generator power input. This would be useful if additional power sources such as a solar cell array, car cigarette lighter, or other batteries of different voltages were available. The system shown could then successfully convert these other power sources to charge or drive a variety of output voltages and currents as already described for the generator.

FIG. 3E is a firmware flowchart that details the operation of the circuit board. As cranking is initiated and voltage is produced, the microprocessor comes alive and executes a sequence of steps to initialize itself and reset the various convertor circuit chips. A polling loop is then entered into which monitors crank rpm, position, and monitors load voltage and current, and looks for any user button presses. The procedure computes and stores progress such as energy delivered so far, battery conditions such as temperature, etc. as earlier described. It also drives the display for all user information.

Additionally, human input torque capability is typically a function of the hand and arm position and direction of applied force, hence of crank angular position. The same is true of leg-driven devices. In one embodiment, the control system adjusts the crank torque as a function of crank angle so that the drag is higher at the stronger arm positions and lower at the weaker arm positions as the crank is rotated through 360 degrees. Essentially any profile of crank torque versus rpm or angle can be readily implemented using this approach.

FIG. 3F is a simplified illustration of a power source 310 with the housing 312 and the arm 354 of the crank assembly 314 at eight different rotational positions. In FIG. 3F, the arm 354 in (i) the first position 300A is at approximately 0 degrees, (ii) the second 300B is at approximately 45 degrees, (iii) the third position 300C is at approximately 90 degrees, (vi) the fourth position 300D is at approximately 135 degrees, (v) the fifth position 300E is at approximately 180 degrees, (vi) the sixth position 300F is at approximately 225 degrees, (vii) in the seventh position 300G is at approximately 270 degrees, and (viii) the eighth position 300H is at approximately 315 degrees. It should be noted that the illustrations of the positions 300A–300H are for convenience of the reader and can be varied.

In one embodiment, for example, (i) the torque experienced by the user can be less at the first position 300A than the second position 300B, (ii) the torque experienced by the user can be less at the second position 300B than the third position 300C, (iii) the torque experienced by the user can be more at the third position 300C than the fourth position 300D, (iv) the torque experienced by the user can be more at the fourth position 300D than the fifth position 300F, (v) the torque experienced by the user can be more at the fifth position 300F than the sixth position 300G, (vi) the torque experienced by the user can be more at the sixth position 300F than the seventh position 300G, and (vii) the torque experienced by the user can be more at the eighth position 300H than the seventh position 300G. In this example, the torque varies as a function of position. At higher or lower speeds, the same behavior can be implemented at a corresponding higher or lower torque level.

FIG. 3G is a graph that illustrates crank torque versus the arm rotational position for a substantially constant rotational speed. FIG. 3G illustrates that the torque experienced by the user varies according to the rotational position of the arm.

FIG. 3H is an alternate graph that illustrates crank torque versus the arm rotational position for a substantially constant rotational speed for a different design. FIG. 3H also illustrates that the torque experienced by the user varies according to the rotational position of the arm.

For a substantially constant rotational speed, the difference between the maximum crank torque experienced by the user at one rotational position and the minimum crank torque experience by the user at another rotational position can vary. For example for a substantially constant rotational speed, in alternative embodiments, the maximum crank torque can be at least approximately 2, 5, 10, 15, 20, 25, 30, 35, 40, 45, 50, 55, 60, 65, 70, 80, 90, 100, 125, 150, 175, 200, 250, 300, 350, 400, or 500 percent greater than the minimum crank torque experience by the user.

For alternative example embodiments, a substantially constant rotational speed is within 5%, 10% or 20%.

Actively controlling the crank torque drag, as discussed above, can be a highly desirable feature of the power source. For example, as the user is slowing down, the torque required to rotate the crank assembly is reduced. With this design, as rotational velocity decreases, crank torque decreases. This can be desired because the user probably is slowing down because he/she is fatigued. Similarly, as cranking speed is increased, the crank torque required to rotate the crank assembly is raised. In this case, the user is probably speeding up since he/she is feeling strong. This is superior to the typical commercially available power circuitry which maintain a constant wattage output. In this undesirable, but typical case, as the user slows down, the drag increases.

The relationship between the rotational velocity and the crank torque can be varied to suit the design requirements of the power system. For example, in one embodiment a change of rotational velocity of approximately 5% results in a change in crank torque of approximately 1%. Alternatively, (i) a change of rotational velocity of approximately 10% results in a change in crank torque of approximately 10%; a change of rotational velocity of approximately 15% results in a change in crank torque of approximately 20%; and a change of rotational velocity of approximately 20% results in a change in crank torque of approximately 50%.

Additionally, the user input 82 can allow the user to input desired crank torque drag for the convenience of the individual user. With this design, power source 10 allows the user to maintain user comfort by allowing the user to set the cranking drag higher or lower for any speed at which they wish to operate. The battery charge rate is actively controlled so that the crank torque to the user is maintained as specified irrespective of cranking speed. Stated another way, the charge rate is actively controlled to set a comfortable torque for rotating the crank assembly 14. Different people have different desires for cranking torques and speeds. This feature can be implemented via microprocessor code in table lookup or formula fashion.

In an alternative embodiment, the power source is set to deliver a constant battery current charging rate (constant power). This is easy to implement, but results in crank drag that varies according to speed. If the crank speed is lowered, the crank drag torque is increased to make the charging power rate constant (power=torque×speed). Similarly, as cranking speed is increased, the crank torque is lowered to again make the charging power rate constant.

In one embodiment, the control board must have power to begin operation, although the required power is very low. The circuits on the control board have features that can produce sufficient voltage to charge a cap or supercap from a power off state with only human cranking and no cpu help. This is a unique power up feature. This can naturally be done with diode rectifiers for BLDC generators. For SR generators, a small magnet near the plurality of teeth of the rotor component producing modulating e-m fields and a single coil driving a diode bridge can serve provide this unique power up feature.

Another embodiment for initially powering up the internal energy storage component, a supercap in this example, is to briefly drive all generated power into the supercap. After the capacitor is charged (typically 1–3 seconds), the control board will have sufficient power to turn on internal circuitry and operate normally, now driving power to the output batteries being charged.

When the user input includes a certain power level, the control board uses control loops to bring the system from power off to a known good state by slowly ramping up to the power requested by the user. This avoids trying to produce impossible output levels. In the case where a lower output level can be accomplished with two distinct crank torques at some fixed crank speed, the control board ensures that the lower, more efficient crank torque is always chosen.

Many of the features of the present invention are implemented by suitable algorithms that are executed by the control board. For example, all voltages and, currents at critical circuit points, temperature, time, crank position and velocity are monitored by the software routines.

In one embodiment, the control system automatically determines the presence and power requirements of an unknown load attached to the power source. For example, the flow source slowly ramps up the voltage until it sees current flowing. The control board can then examine the voltage at this point and choose a suitable safe default charging rate for the device.

The control system receives the newly processed information from the user input and transfers that information to power circuitry as data, and analog level, or PWM pulse train, ultimately to set the switching waveform of the power convertors through the second relay so that the output can be controlled to achieve the desired output power, etc.

During the operation of the power source 10, the control system monitors the output voltage and the current that are actually being generated. A third data path transfers this information back to the control board.

The control board then transfers all input and output information to the display through the fourth data path, so the user can monitor the progress of the generation process. The display can provide status of various input and output levels such as charging rate, charging efficiency, joules delivered (gas gauge), output voltage, temperature, etc. It can use engineering units such as amps, coulombs, joules, volts, or user units such as cellphone talk time, hours of game play, percent full, charging efficiency, etc. Additionally, moving graphic displays can be employed to guide and pace users to the most ideal speeds and offer motivational tools such as progress bars and other animations to reduce the boredom during longer charging operations.

Moreover, the control system can test for and display fault conditions, such as damaged batteries in the electronic device 11 (illustrated in FIG. 1A).

The plurality of sensors can be included to ensure that the power source is producing power as required to charge whatever mechanical device, through the battery pack, needs to be charged at that time. The plurality of sensors can be arranged so that some of the plurality of sensors are provided on the output load side and some of the plurality of sensors are provided on the input generator side.

The output voltage, current, and temperature are measured at the output side, or battery side. These are useful for monitoring battery-charging conditions in order to keep voltages at proper levels and to avoid overcharge. Different battery chemistries have different charging voltage requirements and charge termination conditions. Tracking current and voltage allows for safe charging and accurate determination of fully charged state by known methods such as a specified end of charge voltage, or negative $\Delta V$ when the voltage drops off by a specific amount near full charge. Additionally, termination based on high cell voltage temperature being reached is also implemented via the temperature sensor.

There are also voltage and current sensors on the input side, the generator side, that are used by the control board for proper commutation of the coil phases. The crank torque (or drag) can be directly measured with a torque sensor such as a strain gauge or alternatively inferred by voltage and current measurements on the battery terminals or the generator stator coil phases. One example method is that in a BLDCM generator, the coil current is proportional to crank torque (by constant Kt). The crank angle and rotation rate can also be measured by an angular sensor such as 3 Hall devices or more simply by counting phase voltage cycles as the poles pass by. This information is used for maintaining the crank torque as specified by the user and also as a function of crank position.

Figure 4:
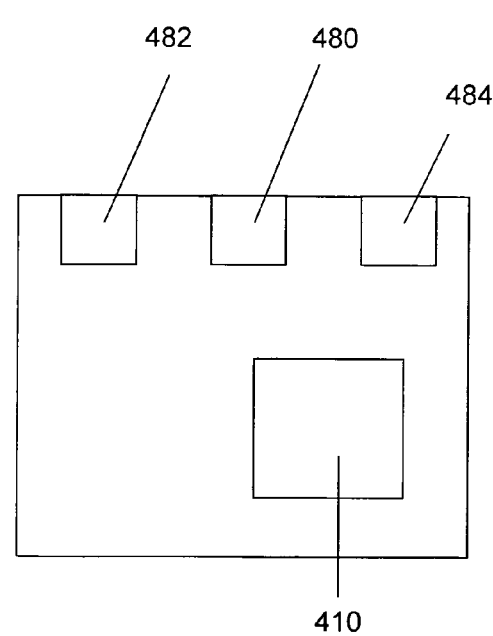
FIG. 4 is a view of another embodiment of a power source having features of the present invention.

FIG. 4 illustrates a view of another embodiment of the power source 410. In this embodiment, the power source 410 (Illustrated as a box) is embedded within an existing mobile electronic device 411 (illustrated as a box). In this embodiment, some of the components of the power source 10 described above may not be necessary in the power source 410. For example, the user input 82, the display 80 and the control board 84 as described above can be integrated into the user input 482, display 480, and the control board 484 of the electronic device 411.

As examples, the combined electronic device 411 can be portable and can include (i) communications devices such as mobile telephones, citizen band radios, family radio spectrum radio, and wireless internet devices, (ii) portable computing devices such as notebook computers, personal digital assistants, and calculators, (iii) military electronic devices, such as night visions devices, communications devices, precision GPS, laser targeting devices, data displays, and computing devices, and (iv) other items such as digital cameras, camcorders, global position satellite devices, portable electronic games, flashlights, radios, and audio CD/MP3 players. Alternatively, for example, the combined electronic device 411 can be stationary.

FIG. 5A illustrates another embodiment of power source 510 in a portable position 502. In this embodiment, the power source 510 includes a housing 512, a crank assembly 514 having a pair of pedals 508, and a stand assembly 506 having a plurality of legs 509. In the portable position 502, the pedals 508 and the legs 509 are folded against the housing 512 to reduce the size of the power source 510. The power source 510 can include components similar to the power source 10 illustrated in FIGS. 1A–1D.

FIG. 5B illustrates the power source of FIG. 5A in a use position 504. In this position, the distal ends of the legs 509 of the stand assembly 506 are rotated away from the housing 512 and support the housing 512 above the ground (not shown). Further, in the use position, the pedals 508 are rotated away from the housing 512. The number of legs 509 can be varied. For example, the stand assembly 506 can include three or four legs 509. Alternatively, the housing 512 could be designed to support the housing 512 in an upright position.

The pedals 508 are adapted to be engaged by the feet of the user. The pedals 508 can go up and down or the pedals 508 can spin. Different methods exist to ensure that unidirectional rotation exists for the dual pedal 508 operated power source 510. In one embodiment, each pedal 508 is adapted so that it pivots on an arm applying unidirectional rotation. A clutch can be used to ensure unidirectional rotation on each pedal 508.

In another embodiment, a rack can be positioned under each pedal 508 that engages a combination of gears and clutches on the arm to ensure unidirectional rotation. And a return spring can forcefully return the pedal to the upper position after it has been pressed fully to the bottom position in preparation for the next power stroke.

Figure 5C:
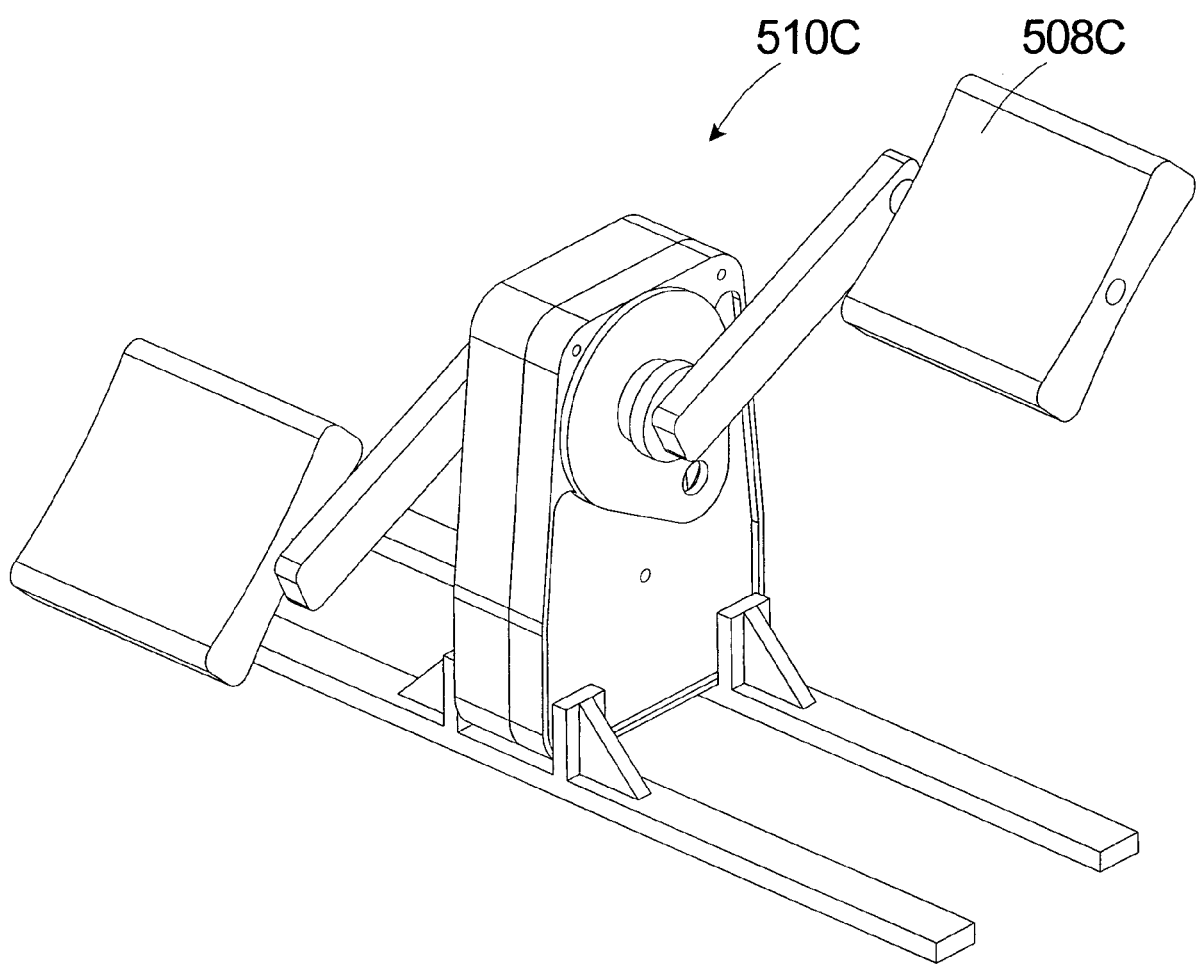
FIG. 5C is a perspective view of yet another embodiment of a power source having features of the present invention.

In yet another embodiment, the pedals 508 are once again adapted to pivot on arms. In this embodiment, the pedals 508 can be designed so that horizontal pedal surfaces push two cams that are rigidly mounted to the arm. In this embodiment, the pedals operate 180 degrees out of phase due to each cam mounting position. In still another embodiment of a dual pedal operated crank assembly, the pedals can be mounted on the arm or on a second arm with a transmission (belt, chain or idler gears) to cause the rotation of the gear assembly. FIG. 5C illustrates yet another embodiment of the power source 510C. In this embodiment, the pedals 508C operate similar to a bicycle with no clutches involved in the operation.

In a dual pedal embodiment of this invention, the arm can be designed so that the pivot assembly is substantially centrally located along the length of the arm, and the arm extends away from the pivot assembly in opposite directions. In this embodiment, instead of a handle connected at the distal end of the arm, pedals are connected at either end of the arm so that a force can be generated to rotate the arm about the pivot assembly in a manner similar to the motion of pedaling a bicycle.

In another embodiment of the present invention, the handle 56 (illustrated in FIG. 1B) can be replaced with a pump. In this embodiment, the pump is designed with a cylinder so that vertical down-up strokes on the cylinder drive the arm through the use of a clutch. The pump method operates in a manner similar to that of an upright bicycle pump.

Alternatively, the crank assembly can be designed so that it can operate with the handle or the pedals, i.e. the handle and pedals are interchangeable. In this embodiment, the user can configure the crank assembly in the field by attaching the handle when a minimal size crank assembly is desired. When maximum power is desired, the user can easily remove the handle and replace with the pedals for operation.

FIG. 6A is a perspective view of first embodiment of a power source combination 600A and an electronic device 611A having features of the present invention. In this embodiment, the power source combination 600A includes a plurality of power sources 610A that are electrically connected together. In this embodiment, each power source 610A can have features similar to the power source 10 described above and illustrated in FIG. 1A. The number of power sources 610A utilized in the power source combination 600A can be varied. For example, in FIG. 6A, the power source combination 600A includes three power sources 610A. Alternatively, the power source combination 600A can include more than three or less than three power sources 610A.

With this design two or more power sources 610 can cooperate to charge one or more batteries of the electronic device 611. In one embodiment of the power source combination 600, each power sources 610 individually raises its output voltage until current starts to flow. The individual power sources 610 monitor and regulate the current at the approximately constant output voltage (set by load battery chemistry, temperature, and charging conditions) and thereby control how many watts are delivered. One of the purposes of controlling the outputted watts from each power sources 610 is that this influences how much drag is felt by the user who is operating the power sources 610, whether the crank assembly is operated with the handle or the pedals. In this combination, information can be communicated back to each of the cooperating users as to whether the battery is nearing full charge, or is charging too fast. This can be monitored through the use of a data line, thermocouples, or other similar monitoring devices.

In one embodiment of the power source combination 600, each power sources 610 is capable of delivering energy to the battery of the electronic device 611 regardless of its voltage. So it is also possible to hook the outputs of multiple power sources 610 in parallel to combine their energy and thus charge a battery more rapidly. A complication to the power source combination 600 is that a battery charging too rapidly needs to be able to communicate this to the multiple power sources 610 so that they slow down. This can be done via a battery-to-power source 610 messages system as employed with smart batteries, or with a power source 610 to power source system where a single power source 610 assumes master control over the other slave power sources 610 and commands their power output maximums. Communication between power sources 610 could be accomplished by placing signals over their joined output power lines. The microprocessor in each slave power sources 610 would receive the slow down commands from the master power sources 610 and reduce power output to prevent battery damage the electronic device 611 from overcharge.

Figure 6B:
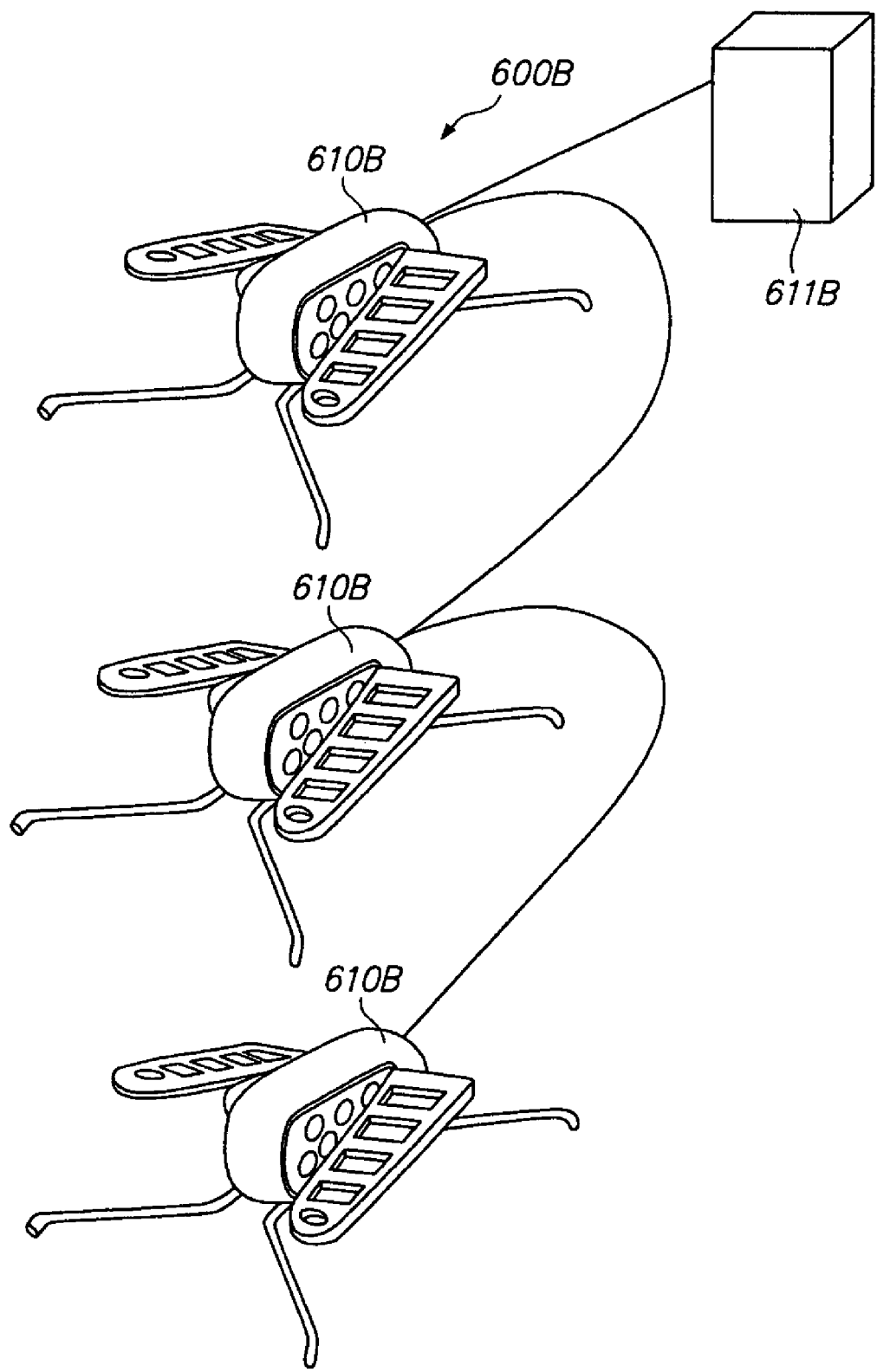
FIG. 6B is a perspective view of second embodiment of a power source combination having features of the present invention.

FIG. 6B is a perspective view of a second embodiment of a power source combination 600B and an electronic device 611B having features of the present invention. In this embodiment, the power source combination 600B includes a plurality of power sources 610B that are electrically connected together. In this embodiment, each power source 610B can have features similar to the power source 510 described above and illustrated in FIGS. 5A and 5B. The number of power sources 610B utilized in the power source combination 600B can be varied. For example, in FIG. 6B, the power source combination 600B includes three power sources 610B. Alternatively, the power source combination 600B can include more than three or less than three power sources 610B.

Figure 6C:
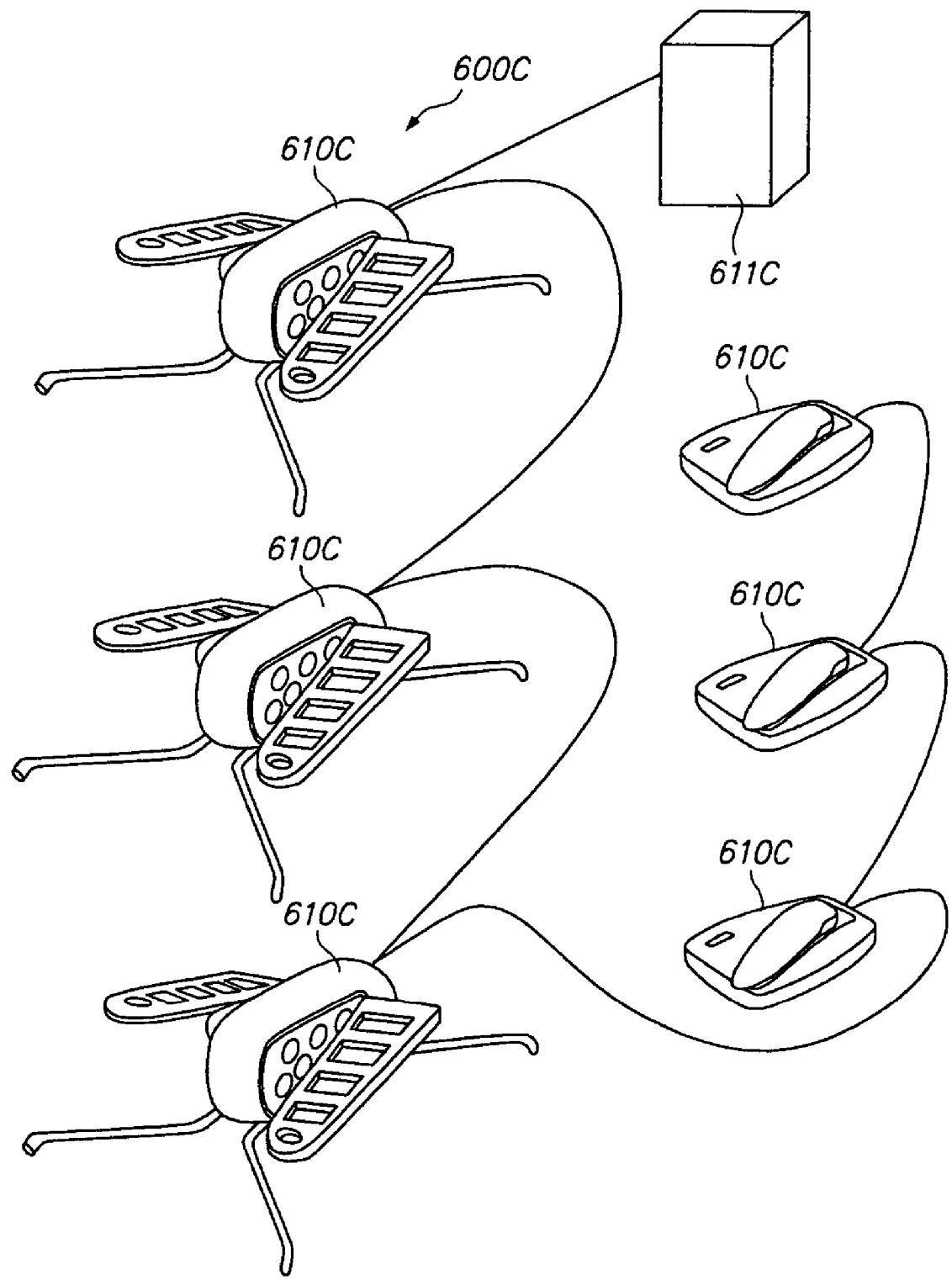
FIG. 6C is a perspective view of third embodiment of a power source combination having features of the present invention.

FIG. 6C is a perspective view of a third embodiment of a power source combination 600C and an electronic device 611C having features of the present invention. In this embodiment, the power source combination 600C includes a plurality of power sources 61.0C that are electrically connected together. In this embodiment, the power source combination 600C includes three power source 610C having features similar to the power source 10 described above and illustrated in FIG. 1A and three power sources 610C having features similar to the power source 510 described above and illustrated in FIGS. 5A and 5B. The number of power sources 610C utilized in the power source combination 600C can be varied.

Figure 7A:
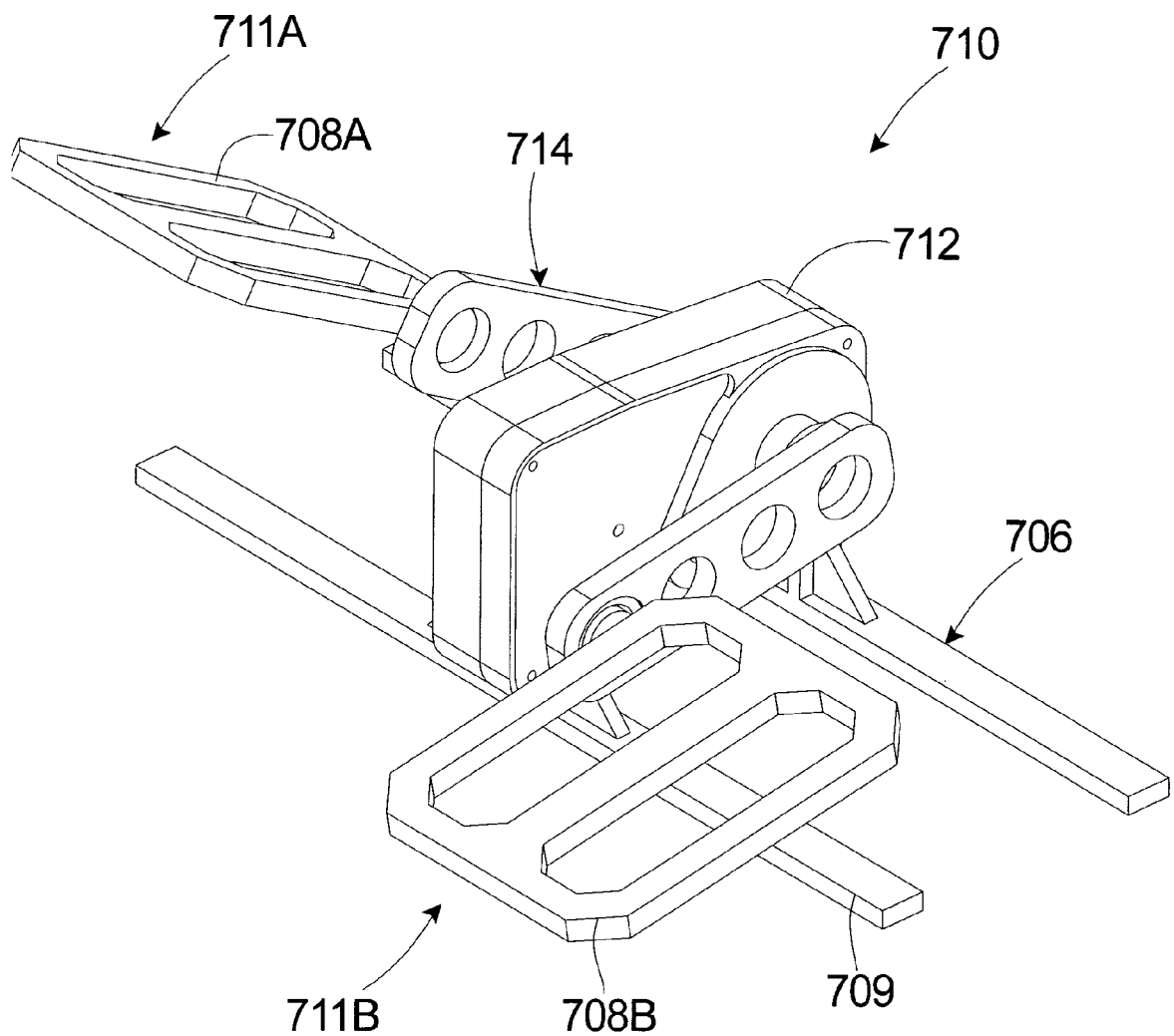
FIG. 7A is a perspective view of another embodiment of a power source having features of the present invention.

FIG. 7A is a perspective view of another embodiment of a power source 710 having features of the present invention. In this embodiment, the power source 710 includes a housing 712, a crank assembly 714 and a stand assembly 706 having a plurality of legs 709 that support the housing 712 above the ground.

In this embodiment, the power source 710 is a foot-operated step charger and the crank assembly 714 includes a first pedal 708A and a spaced apart secured pedal 708B. The pedals 708A, 708B are adapted to be engaged by the feet of the user. In this embodiment, the pedals 708A, 708B are designed to move up in down in alternating fashion and the downward stroke of the foot is the power stroke. Alternatively, the pedals 708A, 708B can be designed to spin similar to the arrangement of FIG. 5C bicycle-style.

Alternatively, the crank assembly 714 can be designed for use with handles (not shown). Alternatively, the handles and the pedals can be interchangeable. In this embodiment, the user can configure the crank assembly 714 in the field by attaching the handles when a minimal size crank assembly is desired. When maximum power is desired, the user can easily remove the handles and replace with the pedals for operation.

In one embodiment, the pedals 708A, 708B and the legs 709 can be selectively folded against the housing 712 to reduce the size of the power source 710.

In this embodiment, each pedal 708A, 708B moves back and forth between a first upper position 711A and a lower position 711B.

Figure 7B:
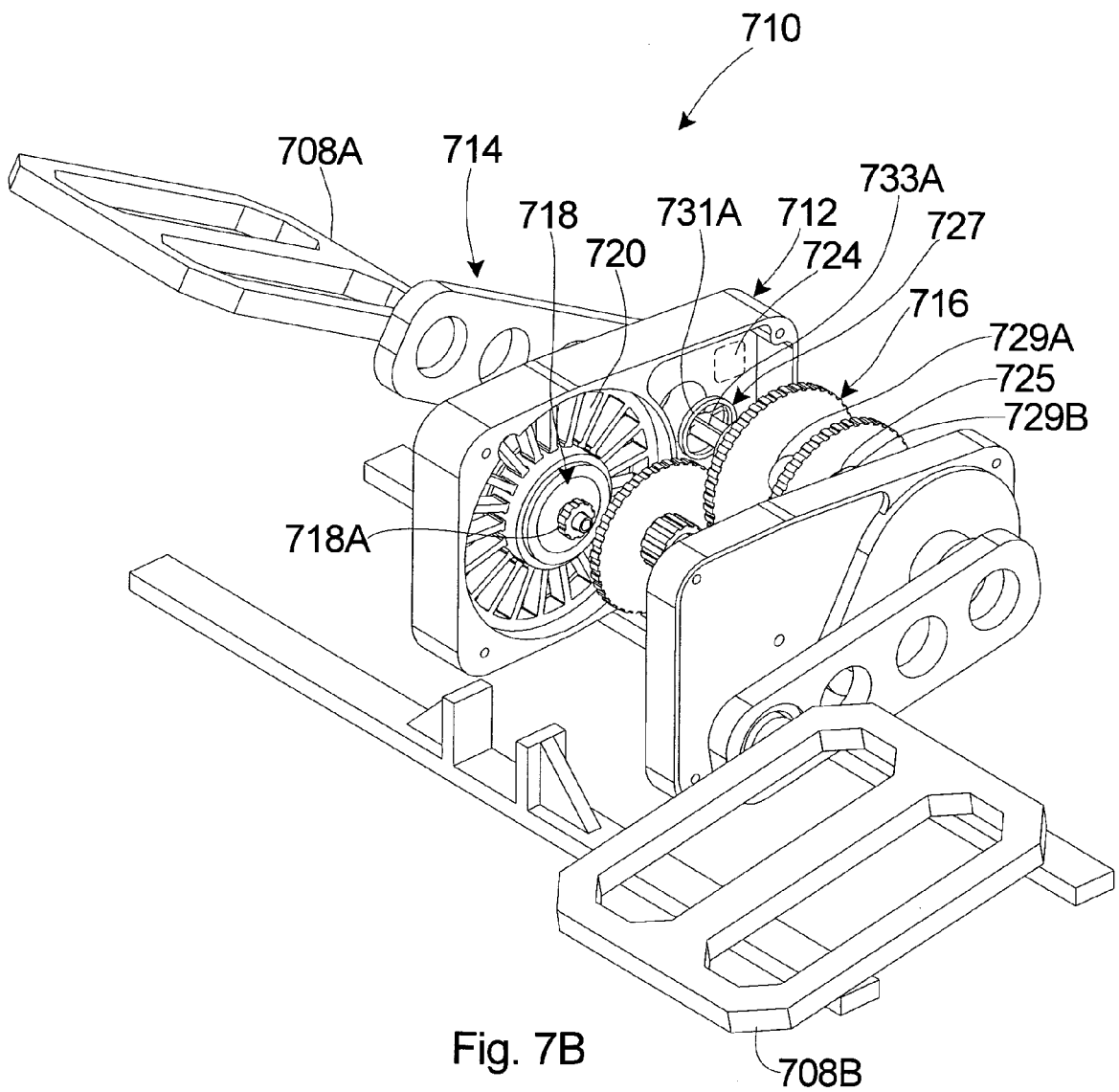
FIG. 7B is a partly exploded perspective view of the power source of FIG. 7A.

FIG. 7B is a partly exploded perspective view of the power source 710 of FIG. 7A including the housing 712, the crank assembly 714, the gear assembly 716, the rotor component 718 including a rotor input 718A, the stator component 720, and the control system 724 (illustrated in phantom), that are somewhat similar to the corresponding components described above. In this embodiment, the crank assembly 714 utilizes pedals 708A, 708B that move up and down while causing unidirectional rotation of the gear assembly 716 and the rotor component 718. Different methods can be used to ensure that unidirectional rotation exists for the dual pedal 708A, 708B operated power source 710. In the embodiment illustrated in FIG. 7B, in addition to the pedals 708A, 708B, the crank assembly 714 includes a one-way drive mechanism, assembly 725 that allows for unidirectional rotation of the gear assembly 716 and the rotor component 718 and a returner assembly 727 that urges each of the pedals 708A, 708B upward.

In the embodiment illustrated in FIG. 7B, the one-way drive mechanism assembly 727 includes a first one-way mechanism 729A (illustrated in phantom) that is coupled with a first crank output 733A to the first pedal 708A and a second one-way mechanism 729B that is coupled with a second crank output 733B (illustrated in FIG. 7C) to the second pedal 708B. Also, the returner assembly 727 includes a first returner 731A that is coupled to the first pedal 708A and a second returner 731B (illustrated in FIG. 7D) that is coupled to the second pedal 708B.

Figure 7C:
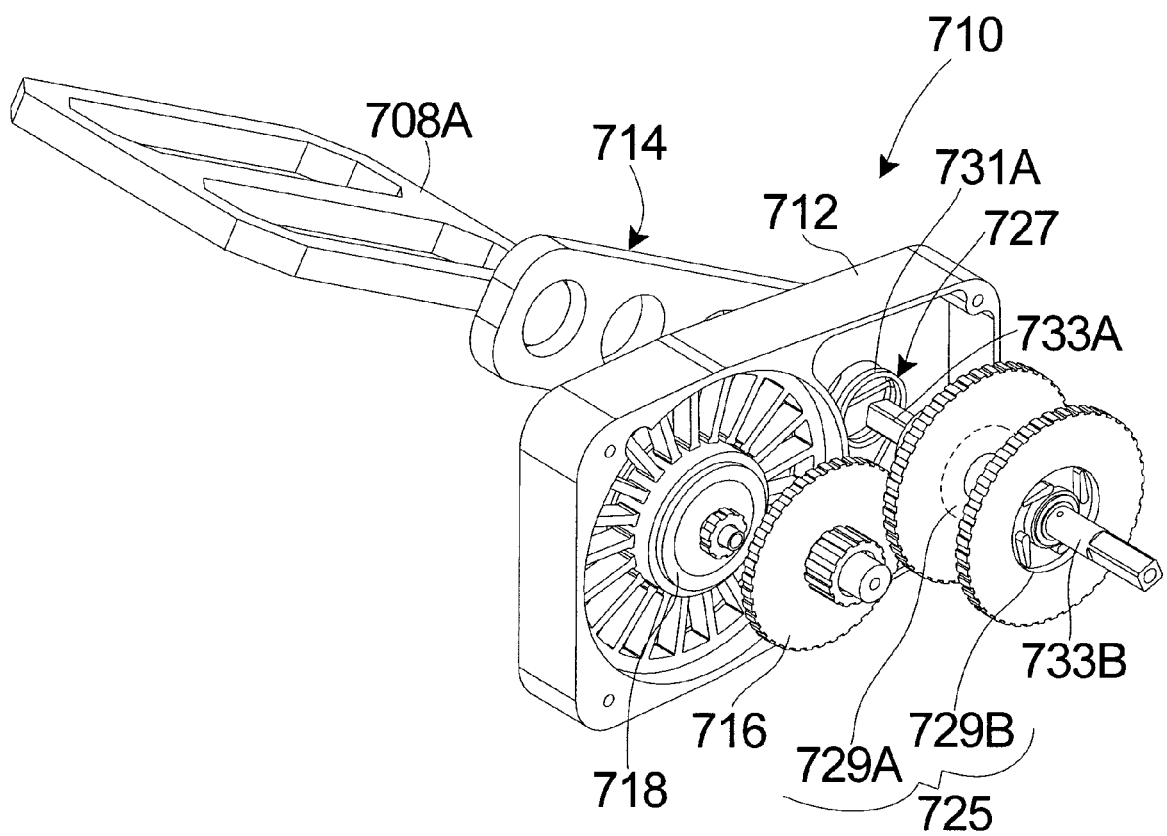
FIG. 7C is an exploded perspective view of a portion of the power source of FIG. 7A.
Figure 7D:
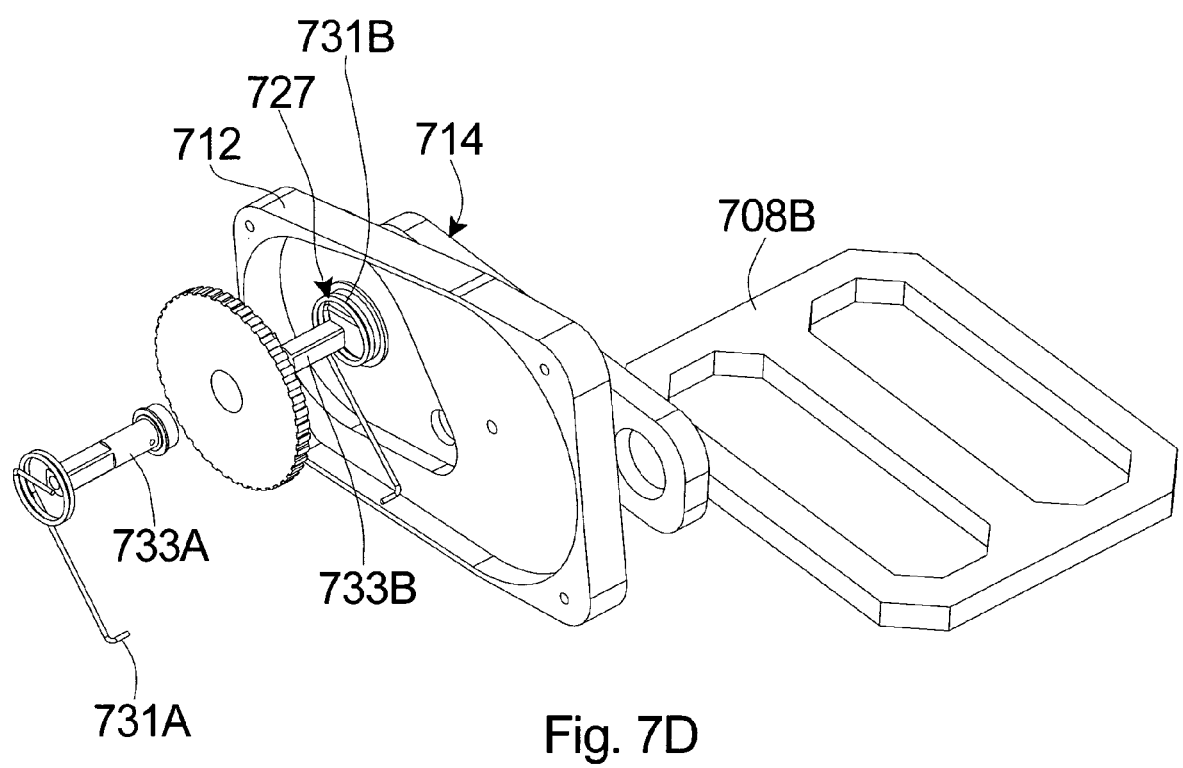
FIG. 7D is another exploded perspective view of a portion of the power source of FIG. 7A.
Figure 7E:
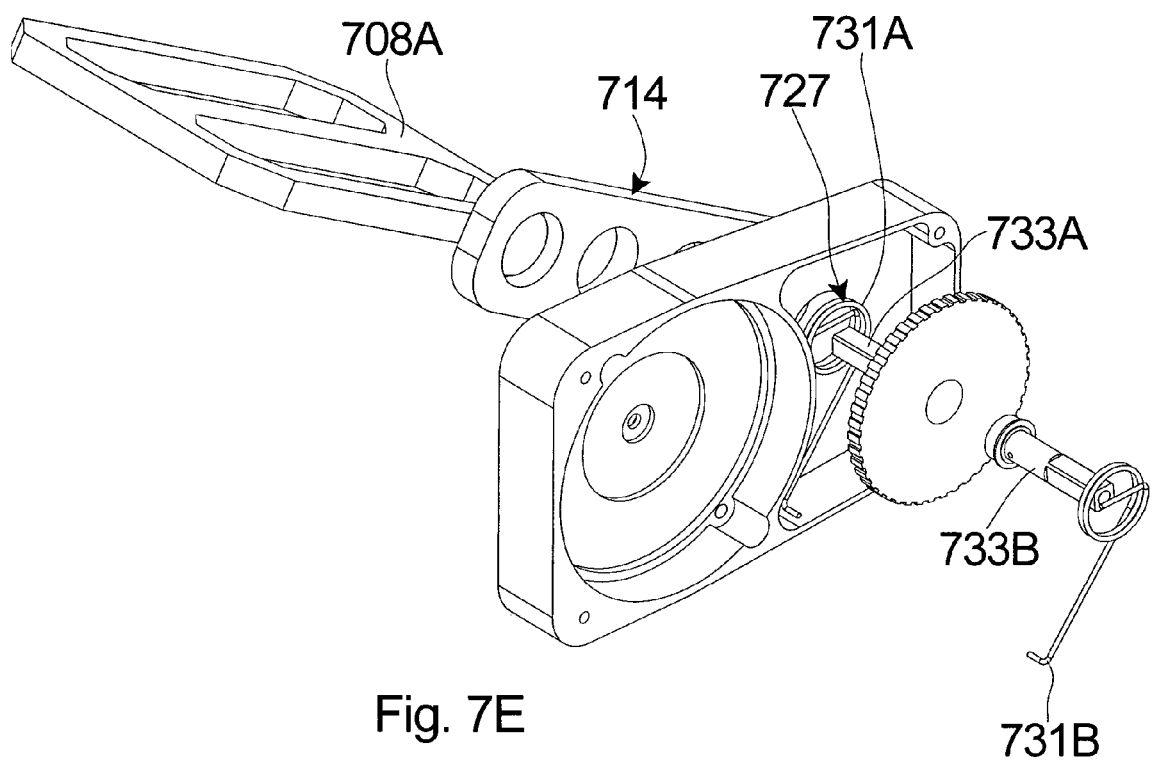
FIG. 7E is another exploded perspective view of a portion of the power source of FIG. 7A.

FIGS. 7C–7E illustrate alternative perspective views of different portions of the power source 710. In this embodiment, each returner 731A, 731B is a resilient member, such as a coil spring that forcefully returns the respective pedal 708A, 708B to the upper position after it has been pressed to the bottom position in preparation for the next power stroke. In this embodiment, each resilient member includes a first end that is secured to the housing 712 and a second end that the coupled to the respective pedal 708A, 708B via the respective crank output 733A, 733B. With this design, after the pedals 708A, 708B are forcefully pressed down by the user's feet, upon reaching the bottom position, the user lifts his foot up and the returner 731A, 731B returns the respective pedal 708A, 708B to the top position.

Figure 7F:
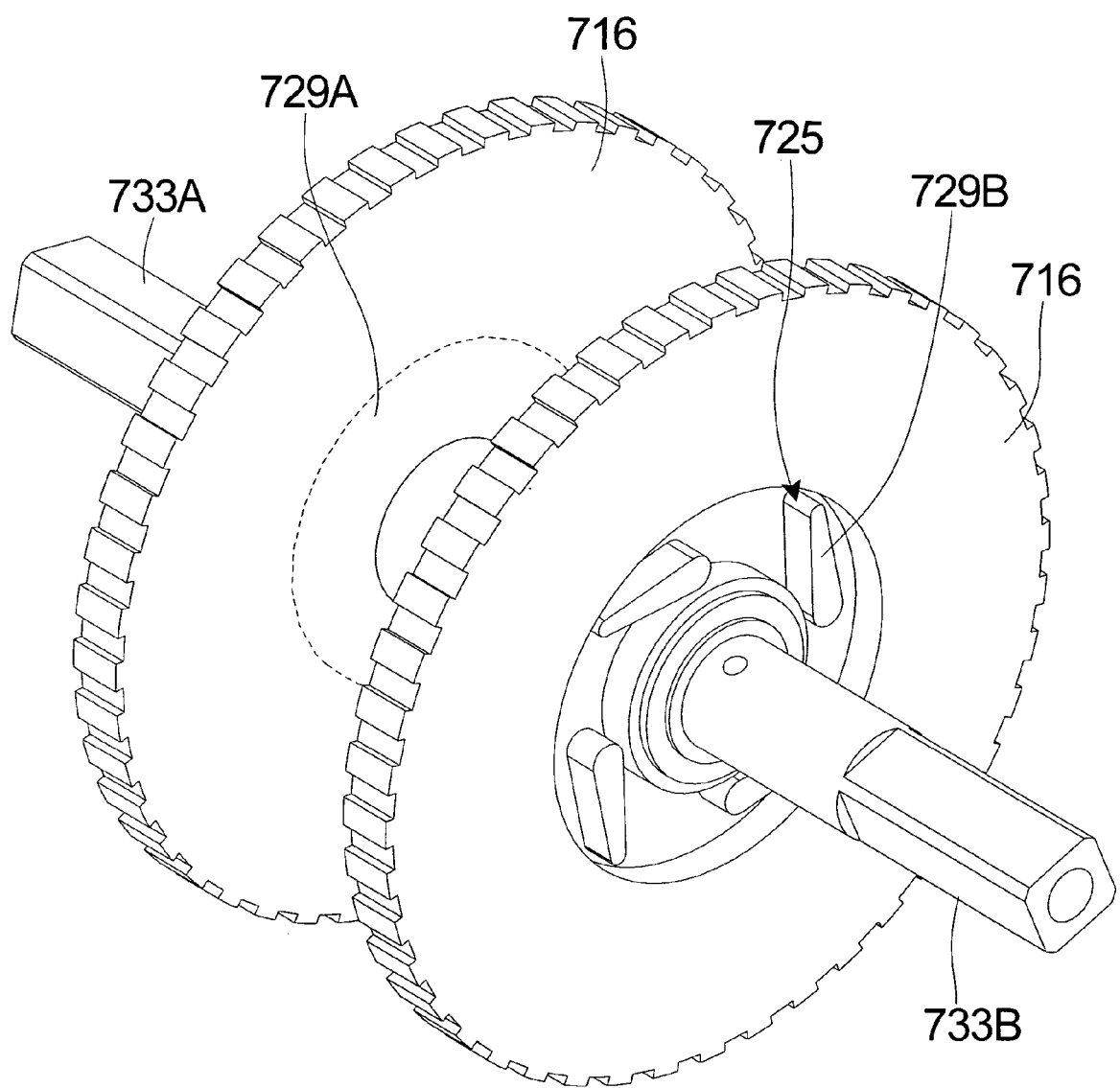
FIG. 7F is a perspective view of a one-way drive mechanism of the power source of FIG. 7A.

FIG. 7F is a perspective view of the one-way mechanisms 729A, 729B and the crank outputs 733A, 733B. In this embodiment, each one-way drive mechanism 729A, 729B is a clutch that couples the respective crank outputs 733A, 733B and pedal 708A, 708B to the gear assembly 716. The clutch allows the respective crank outputs 733A, 733B to engage the gear assembly 716 when rotated in one direction and to disengage the crank outputs 733A, 733B from the gear assembly 716 when rotated in the opposite direction. A suitable clutch is a sprag type clutch.

This design allows for dual-leg operation by the user enabling balanced ergonomics and maximum energy production.

In another embodiment, each one-way mechanism 729A, 729B can be a combination of gears and clutches that ensure unidirectional rotation. In one embodiment, the pedals 708A, 708B can be designed so that horizontal pedal surfaces push two cams that are rigidly mounted to the arm. In this embodiment, the pedals operate 180 degrees out of phase due to each cam mounting position. In still another embodiment of a dual pedal operated crank assembly, the pedals 708A, 708B can be mounted on the arm or on a second arm with a transmission (chain or idler gears) to cause the rotation of the gear assembly 716. In this embodiment, the pedals 708A, 708B operate somewhat similar to a bicycle with no clutches involved in the operation.

In the embodiment illustrated in FIGS. 7A–7F, the control system 724 can make use of the same flexibility of the electronics architecture discussed in connection with the power sources described above, including the ability to monitor crank angles, velocities and crank torques, and voltages and currents at the generator inputs and load battery outputs.

In one embodiment, the control system 724 can have a number of important differences. During operation of a handcranked power system, the cranking direction, torque and rpm of the crank and rotor is unidirectional and reasonably steady. This enables an efficient electrical energy conversion circuit to be used because the somewhat constant input voltages allow for circuit optimization around the limited input voltage range. In contrast, a step powered power source 710 receives drastically different torques depending on whether the pedals 708A, 708B are being forced downwards by the feet of the operator, or returning back upwards with the clutch disengaged. Additionally, depending on the inertia and electrical drag on the rotor component 718, the rpm and hence the output voltage of the power source 710 can vary widely, making an efficient power conversion circuit difficult to achieve.

In one embodiment, the control system 724 senses the pedal 708A, 708B (or other portion of crank assembly 714) positions and velocities (downwards or upwards), and rotor component 718 rotational speed and uses this information to modulate the load/battery charging rates (PWM duty cycle). During forceful pedal 708A, 708B downstrokes, the circuit would set the circuitry to charge the battery rapidly, causing high drag torque on the rotor component 718, to the pedals 708A, 708B and the crank outputs 733A, 733B, and reducing the rpm speedup of the rotor component 718. During the upstroke portion of the pedals 708A, 708B, the circuit would quickly reduce the battery charging rate and thus inhibit rapid slowing down of the rpm of the rotor component 718 to a low speed. Preprogrammed waveforms would transition these duty cycles in a smooth, comfortable fashion for the user. The waveform would tailor the drag torque to conform to the cycle of foot liftup, footfall in elevated pedal position, full foot pressure downwards, and back to foot liftup. In this manner, the rpm of the rotor component 718 is kept in a greatly reduced maximum-to-minimum speed range and thus output voltage range of the power source 710, allowing for higher efficiency energy conversion circuitry to be used as in the case of the hand-cranked power source 710.

Additionally, the control system 724 can control the rpm of the rotor component 718 and control pedal 708A, 708B velocities so the user could have an adjustable comfortable stepping cadence, not too fast or too slow. The "stair climbing" rate could be adjusted by the user by interfacing with the control system 724 to be faster or slower. Also, the adjustable drag method used by the control system 724 allows a low step-up gear ratio mechanism to behave similar to high step-up gear ratio mechanisms—largely at constant speed with operator stepping actions. In some embodiments, lower gear ratios are desirable because they have fewer frictional losses than high gear ratio mechanisms. It would have none of the drastic speedups and slowdowns that plague low gear ratio generators where the power down stroke happens too quickly and the user cannot bring his full weight (and power generating capability) to bear before the pedal comes to the bottom position. In one embodiment, the user would feel as though he were climbing a staircase at largely constant speed (faster or slower as desired).

In one embodiment, the goal of the charging electronics (the control system) that take the voltage/current from the stepping power source 710, make decisions based upon input from multiple factors to provide the load or battery with the optimal power that give a pleasant usage profile of the human user. The control system monitors temperature, revolutions per second, the voltage, and current over time to compute the torque within the generator and amount of charge delivered. The control system provides a load profile to optimize shaft speed and torque which ultimately is reflected in the petals 708A, 708B of the power source 710. This system allows the user to feel a virtual flywheel effect and gives a normal feeling of feedback.

In one embodiment, the power source 710 receives the electrical energy and electronically controls the amount of torque required to rotate the rotor input 718A by dynamically adjusting the level of the output voltage to the load, the output current to the load, and/or the level of the electrical energy delivered to a load. In this embodiment, for example, the control system 724 electronically controls the amount of torque required to rotate the rotor input 718A and/or each crank output 733A, 733B. As an example, when the first pedal 708A is in the first upper position 711A, the torque required to rotate the first crank output 733A is greater (e.g. 1, 2, 3, 5, 10, 20, 30, 40, 50, 60, 70, 80, or 90%) than the torque required to rotate the first crank output 733A when the first pedal 708A is at the second lower position 711B.

In one embodiment, the control system 724 electronically controls the rotational velocity of the rotor component 718 so that the rotational velocity is approximately constant during the movement of each pedal 708A, 708B back and forth between the first position 711A and the second position 711B. As provided herein, in alternative embodiments, approximately constant can mean varying in speed by less than approximately 1, 10, 25, 50, 75 percent.

Figure 8A:
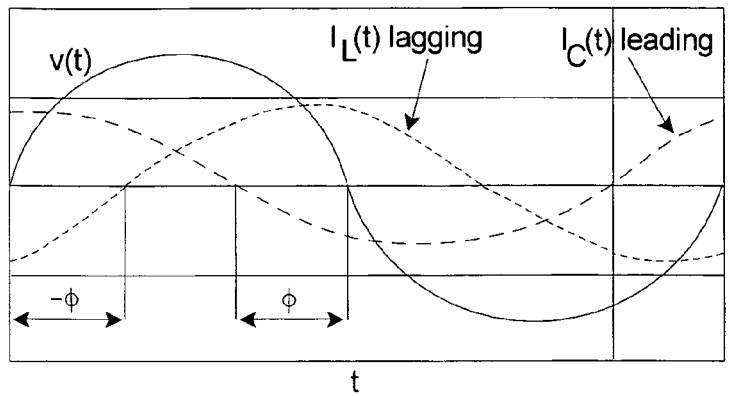
FIG. 8A is a graph that illustrates capacitive and inductive current for one embodiment of a power source.

FIG. 8A is a graph that illustrates capacitive (leading) and inductive (lagging) current for one embodiment of a typical signal phase constant speed power source.

The impedances (in Ohms) are:
a) Resistance (R)
b) Inductive reactance $X_L = \omega L$
c) Capacitive reactance $$X_C = \frac{1}{\omega C}$$

Figure 8B:
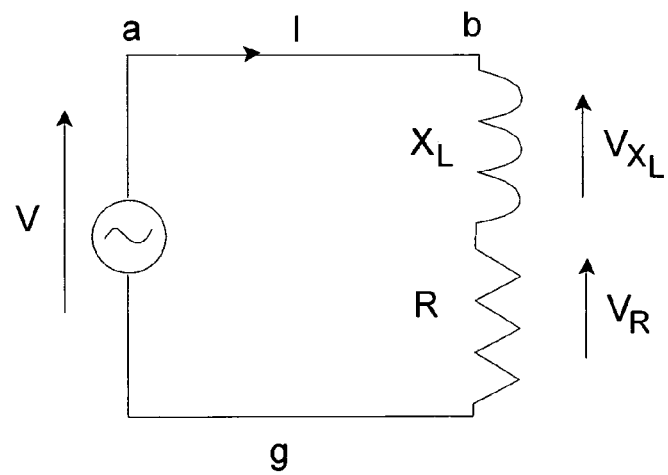
FIG. 8B is an electrical diagram.

FIG. 8B is an electrical diagram that facilitates the Impedance calculation.

The impedance of a resistance and a reactance connected in series is:

$Z = \sqrt{R^2 + X^2}$. The phase angle is: $\varnothing = a \tan X$.

To generate an accurate understanding of the torque waveforms that the charging electronics will see as an input, we must take the simple single phase waveform above and modify it to include a torque profile a typical user may apply in a walking and running state as shown below.

Figure 8C:
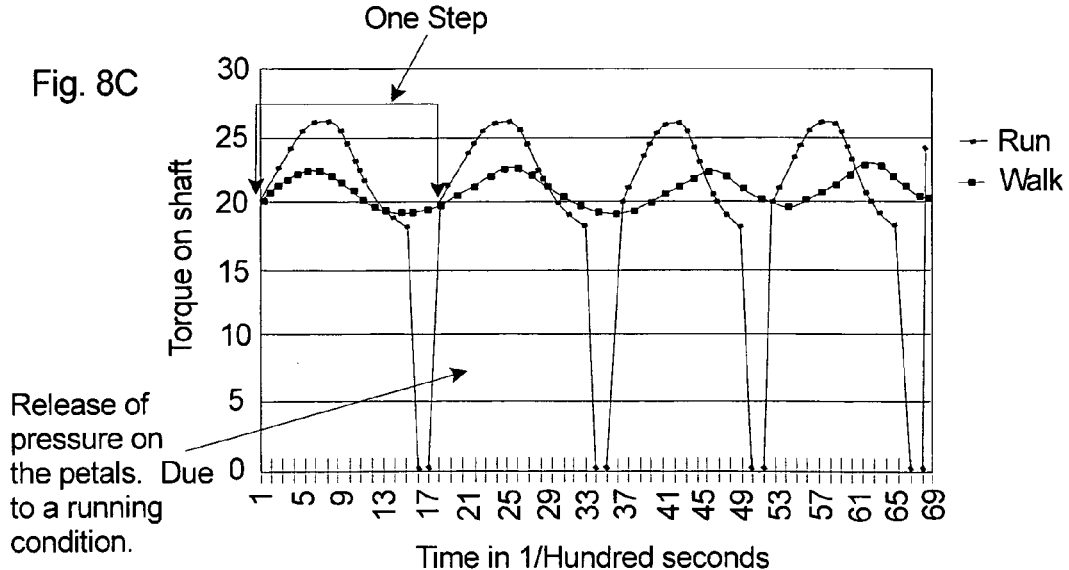
FIG. 8C is a graph that illustrates shaft torque profile for one embodiment of a power source.

FIG. 8C is a graph that illustrates shaft torque profile for one embodiment of a power source.

The charging electronics takes this input and adjusts the output power (Voltage*Current) with methods such as PWM control of a charge into a battery. This can be considered as a variable charge rate into a load and by adjusting this charge rate the torque on the shaft can be altered proportionally, thus by letting the "charge electronics" change the charge rate on the load you can free up the shaft to spin at nearly constant speed through areas of low input torque as though a high inertia flywheel were attached to the rotor component 718. This ability to generate nearly constant rotor 718 velocity irrespective of input shaft torque simulates the effect of a having high inertia flywheel or high step-up gear ratio being present in the system. It results in comfortable operation by the user. With this embodiment, the added size and weight of an actual flywheel, or the high friction levels from a high ratio gear train will not be present. Also, selecting different target rotor speeds would allow the user to adjust the effort levels.

Given known phase and voltage relationships of the input waveform, the method of sensor and control of the charge electronics can be done with and not limited to microprocessor tracking of the input voltage from the generator and PWM control of the load.

Shown herein is an example of a PWM control of a single phase circuit that adjusts the Bipolar circuit of field effect transistors (FET) on time to achieve a desired load current.

Figure 8D:
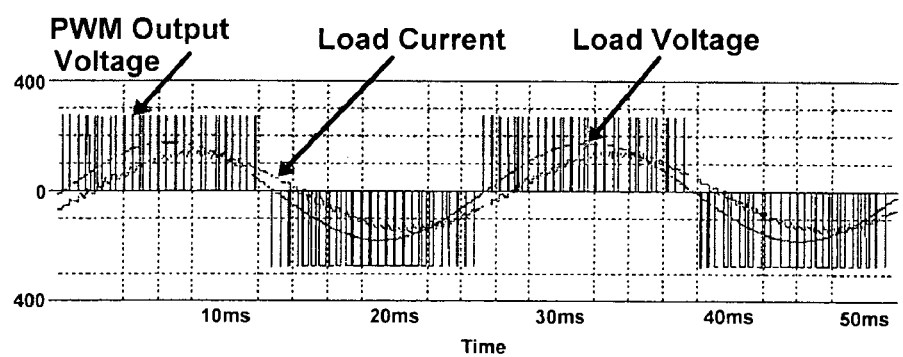
FIG. 8D is a graph that illustrates current, voltage waveforms in bipolar operation of a single phase bridge rectifier with pulse width modulation.

FIG. 8D is a graph that illustrates current, voltage waveforms in bipolar operation of a single phase bridge rectifier with pulse width modulation.

Figure 8E:
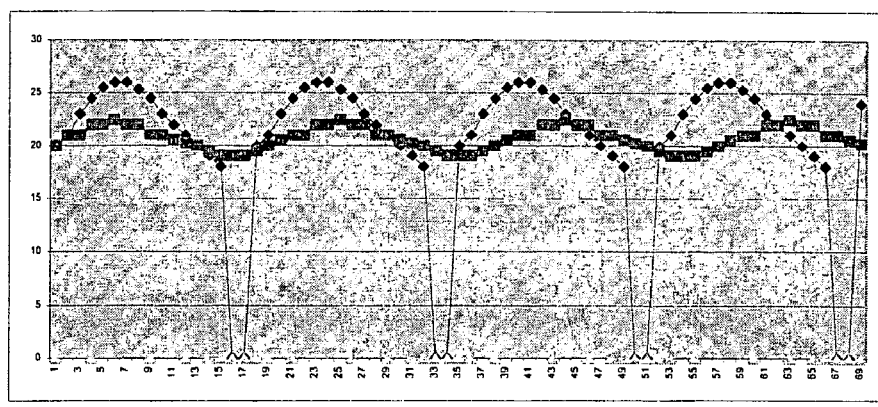
FIG. 8E is a graph that illustrates shaft torque profile for another embodiment of a power source.

Once we combine all the FET PWM outputs with the input waveform we can now visualize the closed loop control illustrated in FIG. 8E. More specifically, FIG. 8E is a graph that illustrates shaft torque profile for another embodiment of a power source.

The method of using PWM to control charge rate does depend on a constant sink source. If the load is not a true sink, for example, a 1K OHM resistor which may look like a full battery, the "on" state of the PWM will not source much current and the user will not feel resistance. To solve this issue we applied a calculated resistive load in addition to the battery. This resistive load is calculated from the input and measured sensor data within the microprocessor. The resistive load can be, but not limited to, a series of resistors controlled by FET or a Sink transistor circuit. With this we can have the same load resistance for all levels of storage capacity of the batteries, thus allowing the PWM to act as the closed loop control.

Figure 9A:
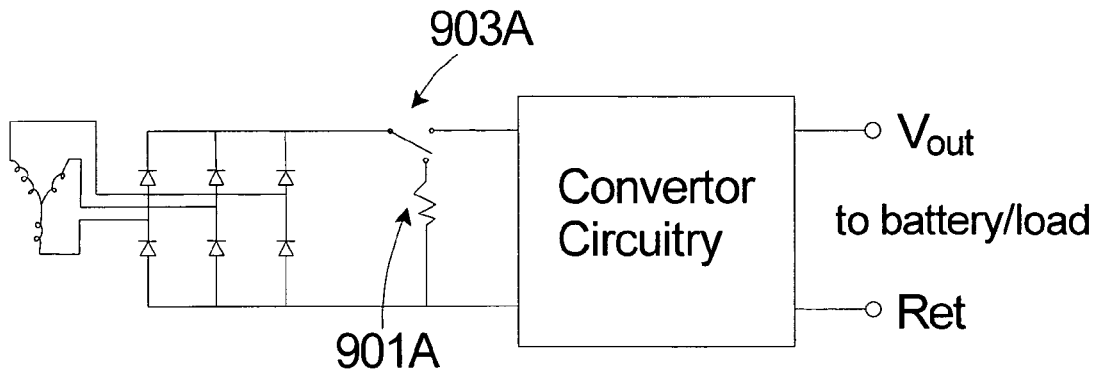
FIG. 9A is a diagram that illustrates one embodiment of an internal shunt that creates input shaft drag.
Figure 9B:
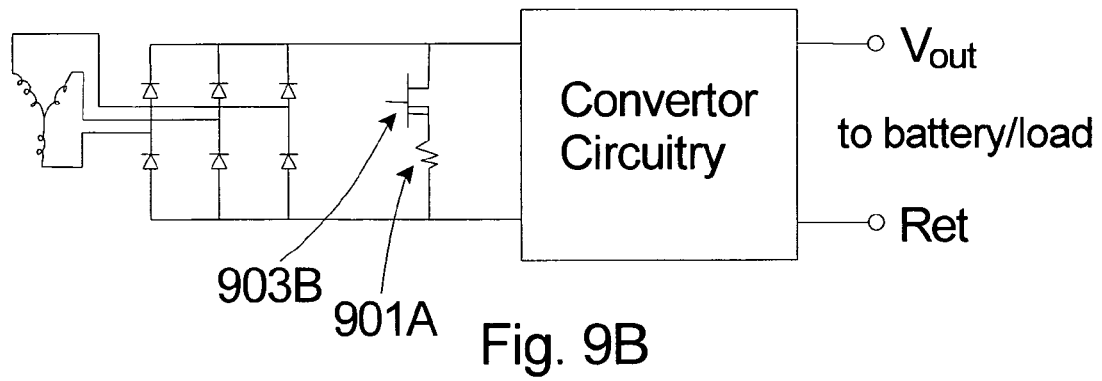
FIG. 9B is a diagram that illustrates an alternative embodiment of an internal shunt for one embodiment that creates input shaft drag.
Figure 9C:
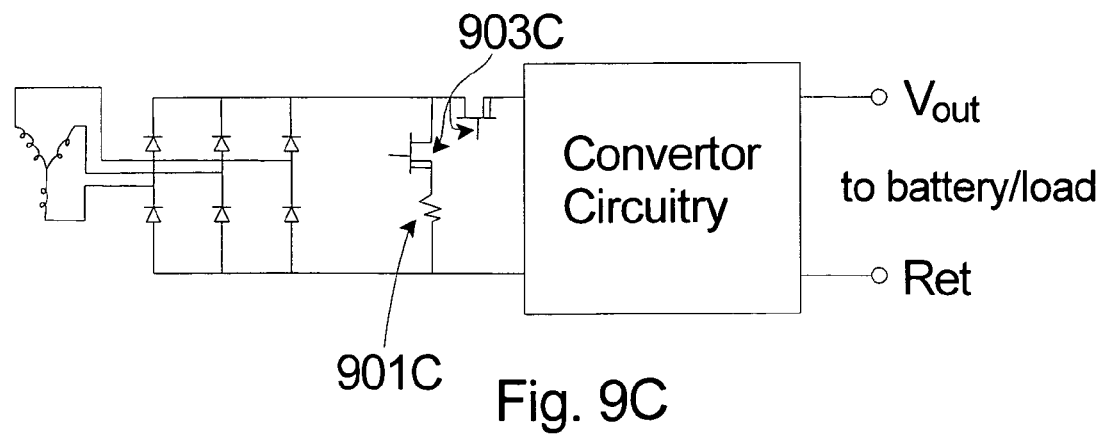
FIG. 9C is a diagram that illustrates yet another embodiment of an internal shunt for one embodiment that creates input shaft drag.

In one embodiment, the control system includes an energy dissipater that selectively dissipates excess energy. Stated another way, the control system can provide a way to selectively and accurately generate drag on the crank assembly in one or more of the power sources described above. More specifically, FIGS. 9A–9C each illustrate an alternative embodiment of a circuit diagram that can be used in the control system. Each of these embodiments includes an additional feature of adding an internal shunt resistor meant to dissipate excess energy. The shunt resistor can be of a fixed value, alternatively it simply can be a short circuit (resistance equals zero), utilizing the resistance of the generator windings. This is so if the battery is charging too fast and the circuit wants to stop putting in all that electricity, it doesn't just stop and thereby reduce the torque on the pedal of the crank assembly to zero and dropping the user to the floor. Instead, it the control system controllably and selectively diverts the electricity into the internal shunt resistor to dump the energy as heat, and still retain some resistance on the pedal to the user. In the case of a zero ohm shunt resistance, the energy would be dissipated as heat primarily in the stator windings. Various control implementations of this internal energy shunt are possible. In the embodiments illustrated, each circuit includes a shunt resistor 901A, 901B, 901C and a switch 903A, 903B, 903C that actively controls the current to the respective shunt resistor 901A, 901B, 901C. One possible method is shown in FIG. 9B. In this embodiment, the internal shunt 901B is placed in parallel with the converter circuitry, with a pulse width modulated micro-controlled switch 903B actively controlling the amount of energy diverted to the resistor 901B. Another method is to implement the SPDT switch 903A of FIG. 9A with PWM switched FETs as shown in FIG. 9C.

This is not a required addition to the unit, but a possibly useful addition. At some point, the user should slow down his charging rate, save his effort.

Additionally, the control system can cause one or more signals or information to be transmitted to the user through the crank assembly. Stated another way, an additional unique feature of the current invention is to allow the creation of vibrations and pulses into the foot pedals or hand crank as the power source is being operated to transfer one or more signals to the user. A way to do this would be to have the control system abruptly change the charging rate to the load for an interval of time, and then returning to the previous charging rate. The user would feel a "pulse" through their hands or feet. Alternatively, for example, the control system can transfer current to a separate motor that vibrates the housing and/or crank assembly.

The vibration and/or pulses can be used to convey information or signals to the user such as charging progress, charging complete, optimal cranking speeds, slowdown cranking, speed up cranking, or information that would be displayed by the display 80. This information can be coded as pulses to be felt by the user. The advantage of this method is that the user need not have a clear view of the display in order to still receive information. This would be especially advantageous in the foot operated unit where the users eyes are several feet away from the data display on the device. The time interval can vary according to the type of information being transferred. For example, the time interval can be alternatively 0.1, 0.2, 0.3, 0.4, 0.5, 0.6, 0.7, 0.8, 1, 1.5, 2, 3, or 5 seconds.

As provided herein, a first type of information can be transferred with a first signal and a second type of information can be transferred with a second signal. As an example, the first signal can be one or more pulses at a first time interval and the second signal can be one or more pulses at a second time interval that is different than the first time interval.

Stated another way, the control system can cause the crank assembly to vibrate at a first pulse to transfer the first signal to the user and can cause the crank assembly to vibrate at a second pulse to transfer a second signal to the user, the second pulse being different than the first pulse. As provided herein, the control system can cause a torque of the crank assembly to change at a first rate to transfer a first signal to the user and can cause the torque of the crank assembly to change at a second rate to transfer a second signal to the user.

While the particular power sources as shown and disclosed herein is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A power source that is powered by a user to charge a load, the power source comprising:
   a housing;
   a stator component secured to the housing;
   a rotor component that rotates relative to the stator component, wherein rotation of the rotor component relative to the stator component results in the generation of electrical energy;
   a crank assembly that includes a first crank output that is rotated by the user, wherein rotation of the first crank output results in rotation of the rotor component; and a control system that receives the electrical energy and electronically controls the amount of torque required to rotate the rotor component based on at least one of (i) an angular velocity of the first crank output, (ii) an angular position of the crank assembly, (iii) a current in the load, and (iv) a current generated by rotation of the rotor component relative to the stator component.

2. The power source of claim 1 wherein the control system includes an additional electrical input for receiving electrical energy from an additional power source.

3. The power source of claim 1 wherein the control system causes a first signal to be transmitted to the user through the crank assembly.

4. The power source of claim 3 wherein the control system causes the crank assembly to vibrate to transfer the first signal to the user.

5. The power source of claim 4 wherein the control system causes the crank assembly to vibrate at a first pulse to transfer the first signal to the user.

6. The power source of claim 5 wherein the control system causes the crank assembly to vibrate at a second pulse to transfer a second signal to the user, the second pulse being different than the first pulse.

7. The power source of claim 3 wherein the control system causes the torque required to rotate the rotor component to change at a first rate to transfer a first signal to the user.

8. The power source of claim 7 wherein the control system causes the torque required to rotate the rotor component to change at a second rate to transfer a second signal to the user.

9. The power source of claim 1 wherein the control system including an energy dissipater that selectively dissipates energy.

10. A power source that is powered by a user to charge a load, the power source comprising:
a stator component;
a rotor component that rotates relative to the stator component, wherein rotation of the rotor component relative to the stator component results in the generation of electrical energy;
a crank assembly that includes a first crank output that is rotated by the user, the first crank output being coupled to the rotor component so that rotation of the first crank output results in rotation of the rotor component; and
a control system that receives the electrical energy and electronically controls the amount of torque required to rotate the rotor component based on (i) an angular velocity of the first crank output, (ii) an angular position of the crank assembly, (iii) a current in the load, or (iv) a current generated by rotation of the rotor component relative to the stator component.

11. The power source of claim 10 wherein the control system includes an additional electrical input for receiving electrical energy from an additional power source.

12. The power source of claim 10 wherein the control system causes a first signal to be transmitted to the user through the crank assembly.

13. The power source of claim 12 wherein the control system causes the crank assembly to vibrate to transfer the first signal to the user.

14. The power source of claim 13 wherein the control system causes the crank assembly to vibrate at a first pulse to transfer the first signal to the user.

15. The power source of claim 14 wherein the control system causes the crank assembly to vibrate at a second pulse to transfer a second signal to the user, the second pulse being different than the first pulse.

16. The power source of claim 12 wherein the control system causes the torque required to rotate the rotor component to change at a first rate to transfer a first signal to the user.

17. The power source of claim 16 wherein the control system causes the torque required to rotate the rotor component to change at a second rate to transfer a second signal to the user.

18. The power source of claim 10 wherein the control system including an energy dissipater that selectively dissipates energy.

* * * * *